US011422553B2

(12) United States Patent
Sadeghi et al.

(10) Patent No.: US 11,422,553 B2
(45) Date of Patent: Aug. 23, 2022

(54) METHODS AND APPARATUS TO ADJUST AUTONOMOUS VEHICLE DRIVING SOFTWARE USING MACHINE PROGRAMMING

(71) Applicant: Intel Corporation, Santa Clara, CA (US)

(72) Inventors: Bahareh Sadeghi, Portland, OR (US); Hassnaa Moustafa, Sunnyvale, CA (US); Shengtian Zhou, Palo Alto, CA (US); Jeffrey Ota, Morgan Hill, CA (US); Justin Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 299 days.

(21) Appl. No.: 16/457,030

(22) Filed: Jun. 28, 2019

(65) Prior Publication Data

US 2019/0324458 A1 Oct. 24, 2019

(51) Int. Cl.
*G05D 1/00* (2006.01)
*G06F 8/65* (2018.01)
(Continued)

(52) U.S. Cl.
CPC ........... *G05D 1/0088* (2013.01); *B60W 50/00* (2013.01); *G05D 1/0276* (2013.01); *G06F 8/65* (2013.01);
(Continued)

(58) Field of Classification Search
CPC ............... G05D 1/0088; G05D 1/0276; G05D 2201/0213; G06F 8/65; B60W 50/00;
(Continued)

(56) References Cited

U.S. PATENT DOCUMENTS 10,417,910 B2 * 9/2019 Scofield ................. H04W 4/029
10,692,371 B1 * 6/2020 Nix ......................... G07C 5/008
(Continued)

OTHER PUBLICATIONS

Federal Highway Administration, "Average Annual Vehicle Miles Traveled by Major Vehicle Categories," Highway Statistics 2016, Accessed Nov. 20, 2018. Retrieved from the Internet: <URL: https://www.afdc.energy.gov/data/10309> (1 page).
(Continued)

*Primary Examiner* — Peter D Nolan
*Assistant Examiner* — Peter Y Ning
(74) *Attorney, Agent, or Firm* — Hanley, Flight & Zimmerman, LLC

(57) ABSTRACT

Methods, apparatus, systems and articles of manufacture are disclosed that adjust autonomous vehicle driving software using machine programming. An example apparatus for adjusting autonomous driving software of a vehicle includes an input analyzer to determine a software adjustment based on an obtained driving input and a priority determiner to determine a priority level of the software adjustment. The apparatus further includes a program adjuster to, when the priority level is above a threshold, identify a parameter of the autonomous driving software of the vehicle associated with the software adjustment and adjust the parameter based on the software adjustment, the adjustment to the parameter to change driving characteristics of the vehicle.

31 Claims, 10 Drawing Sheets

(51) Int. Cl.
*B60W 50/00* (2006.01)
*G05D 1/02* (2020.01)
(52) U.S. Cl.
CPC ............ *B60W 2050/0075* (2013.01); *B60W 2050/0083* (2013.01); *B60W 2556/45* (2020.02); *G05D 2201/0213* (2013.01)
(58) Field of Classification Search
CPC ..... B60W 2556/45; B60W 2050/0083; B60W 2050/0077
See application file for complete search history.

(56) References Cited

U.S. PATENT DOCUMENTS

| | | | | |
|---|---|---|---|---|
| 10,831,207 | B1* | 11/2020 | Leung | G05D 1/0088 |
| 2019/0047584 | A1* | 2/2019 | Donnelly | B60W 30/025 |
| 2019/0071100 | A1* | 3/2019 | Xavier | G05D 1/0061 |
| 2019/0118805 | A1* | 4/2019 | Lim | G07C 5/008 |
| 2019/0258251 | A1* | 8/2019 | Ditty | G06V 20/58 |
| 2019/0303759 | A1* | 10/2019 | Farabet | G06F 9/455 |
| 2019/0384292 | A1* | 12/2019 | Aragon | G07C 5/008 |
| 2020/0117188 | A1* | 4/2020 | Yun | G05D 1/0061 |
| 2020/0231168 | A1* | 7/2020 | Uthaicharoenpong | B60R 16/0231 |
| 2020/0317216 | A1* | 10/2020 | Konrardy | B60W 30/182 |
| 2020/0339160 | A1* | 10/2020 | Rosenbaum | B60W 40/04 |
| 2020/0365014 | A1* | 11/2020 | Ray | G08G 1/096775 |
| 2021/0046952 | A1* | 2/2021 | Ju | G01S 17/87 |

OTHER PUBLICATIONS

Lambert, Fred. "Tesla Has Opened the Floodgates of Autopilot Data Gathering," Electrek, Jun. 14, 2017. Retrieved from the Internet: <URL: https://elctrek.co/2017/06/14/tesla-autopilot-data-floodgates/> (14 pages).

Culver, Michelle. "Over-the-air Software Updates to Create Boon for Automotive Market, IHS Says," IHS Markit, Sep. 3, 2015. Retrieved from the Internet: <URL: https://news.ihsmarkit.com/press-release/automotive/over-air-software-updates-create-boon-automotive-market-ihs-says> (5 pages).

"Understanding FOTA in the Times of Connected Cars'," Embitel, Jul. 10, 2018. Retrieved from the Internet: <URL: https://www.embitel.com/blog/embedded-blog/understanding-fota-in-the-times-of-connected-cars.> (5 pages).

Tomás, Juan Pedro. "What is Truck Platooning and Why is it Important?," Enterprise iot Insights, May 17, 2018. Retrieved from the Internet: <URL: https://enterpriseiotinsights.com/20180517/connected-cars-2/what-truck-platooning-why-important-tag23-tag99> (12 pages).

Tomás, Juan Pedro. "How Truck Platooning Can Benefit the Transportation Sector," Enterprise iot Insights, Jun. 5, 2017. Retrieved from the Internet: <URL: https://enterpriseiotinsights.com/20170605/connected-cars-2/20170605connected-cars-2truck-platooning-benefits-transport-sector-tag23> (11 pages).

Lanctot, Roger. "Accelerating the Future: The Economic Impact of the Emerging Passenger Economy," Strategy Analytics, Strategy Analytics Services, Autonomous Vehicles Services, Jun. 1, 2017. Retrieved from the Internet: <URL: https://www.strategyanalytics.com/zh/access-services/automotive/autonomous-vehicles/complimentary/report-detail/accelerating-the-future-the-economic-impact-of-the-emerging-passenger-economy> (3 pages). English abstract included only.

"Taxonomy and Definitions for Terms Related to Driving Automation Systems for On-Road Motor Vehicles," SAE International, Surface Vehicle Recommended Practice, J3016, Sep. 2016 (30 pages).

Phukan, Ruban. "Can Cognitive Predictive Analytics Prevent Automobile Recalls,?" Progress, Cognitive Services, Jun. 9, 2017. Retrieved from the Internet: <URL: https://www.progress.com/blogs/can-cognitive-predictive-analytics-prevent-automobile-recalls> (4 pages).

Ramanujam, Srivatsan. "The Data Science Behind Predictive Maintenance For Connected Cars," Pivotal, May 24, 2016. Retrieved from the Internet: <URL: https://content.pivotal.io/blog/the-data-science-behind-predictive-maintenance-for-connected-cars> (8 pages).

Shalev-Shwartz et al. "On a Formal Model of Safe and Scalable Self-driving Cars," Mobileye, 2017. Retrieved from the Internet: <URL: https://arxiv.org/pdf/1708.06374.pdf> (37 pages).

Sabella et al. "Toward fully connected vehicles: Edge Computing for Advanced Automotive Communications," 5GAA Automotive Association, Dec. 2017. Retrieved from the Internet: <URL: http://5gaa.org/wp-content/uploads/2017/12/5GAA_T-170219-whitepaper-EdgeComputing_5GAA.pdf> (19 pages).

Moustafa et al. "Autonomous Driving: Open Fog Support Vehicle-to-Cloud," An OpenFog Consortium White Paper, Feb. 7, 2017, (22 pages).

"Implementing the RSS Model on NHTSA Pre-Crash Scenarios", Mobileye. Retrieved from the Internet: <URL: https://www.mobileye.com/responsibility-sensitive-safety/> (24 pages).

Gottschlich et al. "The Three Pillars of Machine Programming," Intel Labs, MIT, May 2018, 11 pages.

* cited by examiner

METHODS AND APPARATUS TO ADJUST AUTONOMOUS VEHICLE DRIVING SOFTWARE USING MACHINE PROGRAMMING

FIELD OF THE DISCLOSURE

This disclosure relates generally to autonomous vehicles, and, more particularly, to methods and apparatus to adjust autonomous vehicle driving software using machine programming.

BACKGROUND

In recent years, autonomous vehicles have been empowered by artificial intelligence programs that use intensive training and amounts of data collection to perform the training. Once an autonomous vehicle is operational, programs for the environment perception, path planning, and control are built-in by a manufacturer of the vehicle and are updated, for example, through a maintenance cadence. Over-the-air (OTA) updates are possible for new patches of software for the programs of the autonomous vehicle that can implement new features and fix existing software issues.

Figure 1:
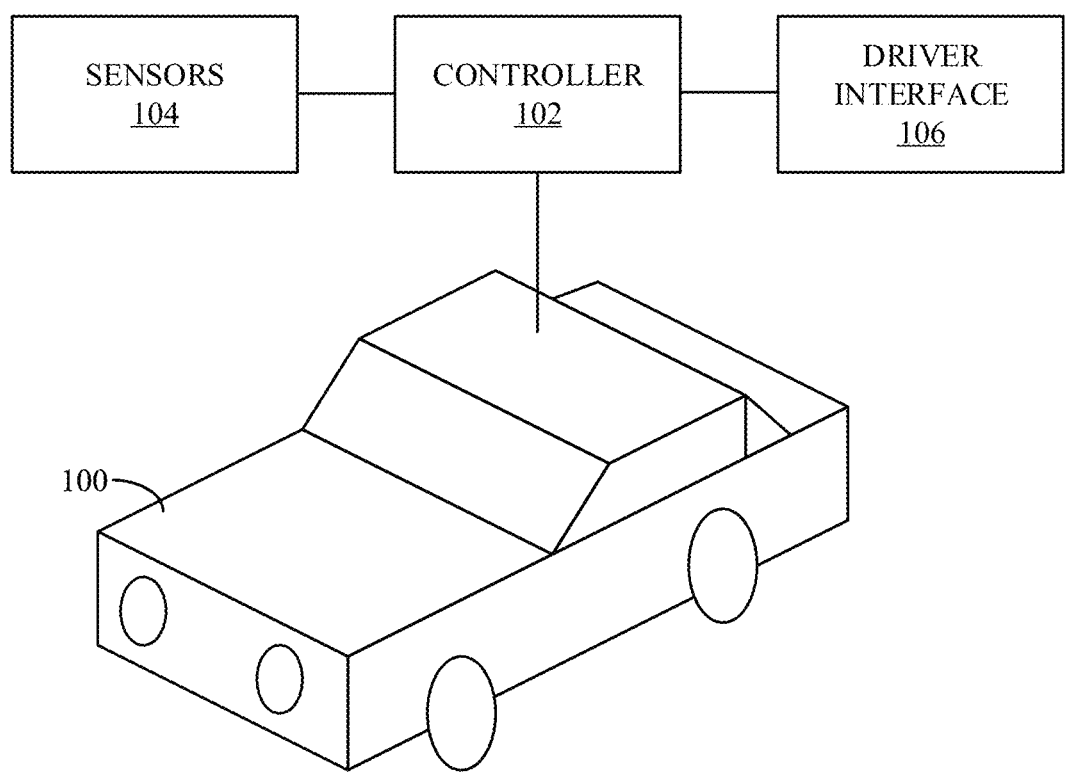
FIG. 1 is a schematic illustration of an example autonomous vehicle implementing an example controller.

The figures are not to scale. Instead, the thickness of the layers or regions may be enlarged in the drawings. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, autonomous vehicles have been empowered by artificial intelligence programs that use intensive training and amounts of data collection to perform the training. Once an autonomous vehicle is operational, programs for the environment perception, path planning, and control are built-in by a manufacturer of the vehicle and are updated, for example, through a maintenance cadence. Known methods for updating autonomous vehicles include implementing over-the-air (OTA) updates for new patches of software for the programs of the autonomous vehicle. The OTA updates of these known autonomous vehicles can create new features and/or fix existing software issues.

However, known methods for updating the programs of the autonomous vehicles lack a standard method for providing the updates to fit all vehicles. For example, the known methods implement the same updates to all vehicles in the same manner, regardless of the different conditions that may be present with different vehicles. Because each vehicle will experience different stimuli over time, the same updates will have varying levels of effectiveness in improving the driving style of the autonomous vehicle or fixing problems in the program of the autonomous vehicle. There is therefore a desire for individualized updates to the programs of autonomous vehicles to adjust the driving styles and driving parameters based on inputs specific to each autonomous vehicle, typical driving scenarios encountered by the autonomous vehicle, rider preferences of the autonomous vehicle, etc.

Examples disclosed herein use machine programming to determine updates to a specific autonomous vehicle program based on inputs to the autonomous vehicle. For example, the inputs may include inputs from passengers in the autonomous vehicle (e.g., via facial recognition, voice inputs, etc.), a driver or passenger profile (e.g., specific habits of the owner, driver, or passenger of the autonomous vehicle), insurance information (e.g., parameters of an insurance policy, etc.), etc. The disclosed examples use the inputs to determine potential updates or adjustments to the program of the autonomous vehicle that would conform the driving style of the autonomous vehicle to the driving preferences of the driver and/or a passenger.

In some examples, the updates to the autonomous driving programs are implemented based on a priority level. For example, the updates may be assigned a priority level (e.g., low, medium, high, etc.) and the updates may be implemented or not implemented based on the priority level (e.g., only high priority updates are implemented). In some examples, the updates can be implemented immediately (e.g., in real-time) as inputs are obtained. For example, when an adjustment to the autonomous driving program is of high priority, the adjustment may be implemented to correct an issue in the program or to account for sudden changes in driving conditions.

Example approaches disclosed herein obtain certifications for the updates to the program from, for example, safety organizations (e.g., the National Highway Traffic Safety Administration (NHTSA), insurance companies, original equipment manufacturers (OEMs), etc. In some examples, machine learning and/or artificial intelligence is used to determine whether an update to an autonomous driving program is to be certified (e.g., whether the update to the program should be allowed) based on the certification standards of the organizations, insurance providers, OEMs, etc.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data (e.g., autonomous driving programs and/or metadata associated therewith) such that other input(s) result in output(s) consistent with the recognized patterns and/or associations.

FIG. 1 is a schematic illustration of an example autonomous vehicle 100 implementing an example controller 102. The autonomous vehicle 100 of the illustrated example can be a fully autonomous vehicle or a semi-autonomous vehicle. The example autonomous vehicle 100 includes autonomous driving software that controls driving characteristics of the autonomous vehicle 100. For example, the autonomous driving software can control a speed of the autonomous vehicle 100 (e.g., relative to a speed limit), a braking distance of the autonomous vehicle 100, an aggressiveness level of the driving, etc.

In the illustrated example, the controller 102 is communicatively coupled to sensors 104 and a driver interface 106. The example controller 102 receives inputs from the sensors 104 and/or the driver interface 106 during operation of the autonomous vehicle 100. The controller 102 can then use the inputs to determine changes to the autonomous driving software of the autonomous vehicle 100. The changes to the autonomous driving software create changes in the driving characteristics of the autonomous vehicle 100. The sensors 104 of the illustrated example can include sensors used in systems of the autonomous vehicle 100. For example, the sensors 104 can include wheel speed sensors, ride height sensors, steering wheel sensors, temperature sensors, seat occupancy sensors, etc. Additionally or alternatively, the sensors 104 can include sensors to detect implicit human inputs. For example, the sensors 104 can include facial recognition sensors, voice recognition sensors, motion detection sensors, etc.

The driver interface 106 of the illustrated example can collect explicit inputs from passengers and/or operators of the autonomous vehicle 100. For example, the operator of the autonomous vehicle 100 can input commands to the driver interface 106 (e.g., using voice commands, making tactile selections in the driver interface 106, etc.). In some such examples, the operator of the autonomous vehicle 100 provides voice commands, such as voice commands to increase speed, reducing passing distance, lowering aggressiveness, etc. In some examples, an operator of the autonomous vehicle 100 can input information into the driver interface 106 such as insurance information, driving preferences, etc. For example, the operator of the autonomous vehicle 100 can input insurance information (e.g., specific insurance plan information) into the driver interface 106. This insurance information can be used by the controller 102 to adjust driving characteristics of the autonomous vehicle 100.

When the inputs from the sensors 104 and the driver interface 106 are received by the controller 102, the controller 102 can determine adjustments to the autonomous driving software based on a value or values of the inputs. For example, the inputs can have numerical values (e.g., a desired speed of driving), a binary value (e.g., a yes or no input, such as whether an infant is in the autonomous vehicle 100), etc. Additionally or alternatively, the input can be qualitative, such as a determination that a passenger or operator of the autonomous vehicle 100 is gesturing or has a specific expression on their face (e.g., anger, fright, etc.). These inputs can be used individually or in combination by the controller 102 to determine adjustments to the autonomous driving software.

Figure 2:
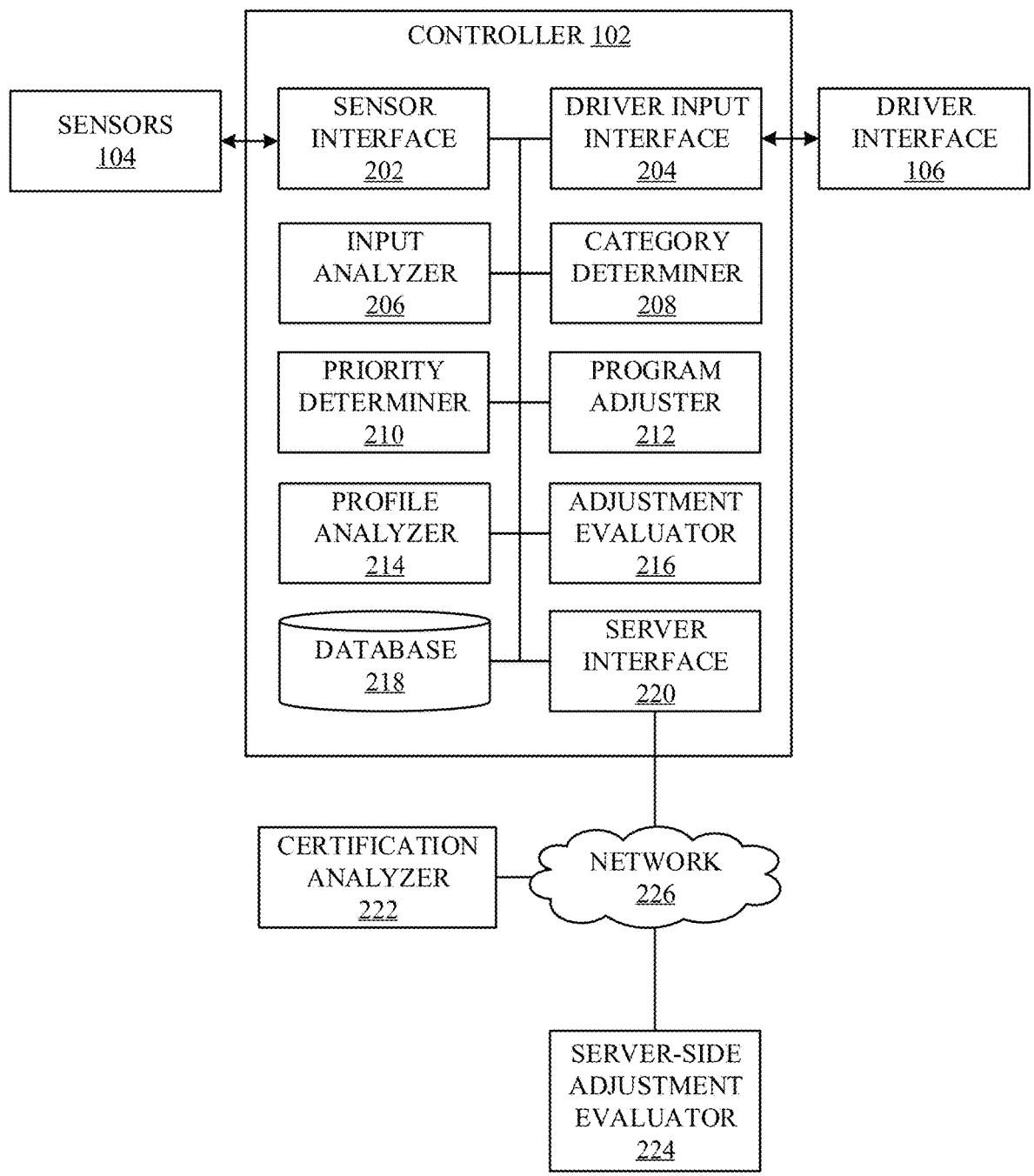
FIG. 2 is a block diagram of the example controller of FIG. 1.

FIG. 2 is a block diagram of the example controller 102 of FIG. 1. In the illustrated example of FIG. 2, the controller 102 includes an example sensor interface 202, an example driver input interface 204, an example input analyzer 206, an example category determiner 208, an example priority determiner 210, an example program adjuster 212, an example profile analyzer 214, an example adjustment evaluator 216, an example database 218, and an example server interface 220. The example sensor interface 202 of the controller 102 is communicatively coupled to the example sensors 104 of FIG. 1 to receive inputs from the sensors 104 during operation of the autonomous vehicle 100 of FIG. 1. The example driver input interface 204 of the controller 102 is communicatively coupled to the example driver interface 106 of FIG. 1 to receive inputs from the driver interface 106 during operation of the autonomous vehicle 100.

The sensor interface 202 and the driver input interface 204 of the controller 102 are additionally coupled to the database 218. The example database 218 can receive and store the inputs received by the sensor interface 202 and the driver input interface 204. In some examples, the database 218 stores a current autonomous driving program for the autonomous vehicle 100. In the illustrated example, the input analyzer 206 uses the inputs received by the sensor interface 202 and the driver input interface 204 to determine potential adjustments to the autonomous driving program stored in the database 218. For example, the input analyzer 206 can analyze human inputs (e.g., facial recognition inputs, speech inputs, etc.) and non-human inputs (e.g., insurance information, passengers in the autonomous vehicle, etc.) that are to be used to adjust the autonomous driving software. In some examples, the inputs are analyzed individually, and a single adjustment is made to the autonomous driving software for each input. In some alternative examples, the input analyzer 206 analyzes multiple inputs and adjusts the autonomous driving software based on all of the inputs simultaneously.

In some examples, the input analyzer 206 uses human inputs to determine adjustments to parameters of the autonomous driving software (e.g., elements of the autonomous driving software, such as speed, stopping distance, etc.). The human inputs may be explicit or implicit. For example, the input analyzer 206 may analyze explicit human inputs, such as voice commands from an operator of the autonomous vehicle 100, inputs into the driver interface 106 by the operator, etc. Additionally or alternatively, the input analyzer 206 may base the adjustments on implicit human inputs, such as gesturing by the operator or a passenger, facial recognition (e.g., detecting frightened passengers from facial recognition).

In some examples, the input analyzer 206 uses non-human inputs to determine adjustments to the parameters of the autonomous driving software. The non-human inputs can include, for example, detection of a road surface (e.g., smooth, potholes, etc.) based on ride height sensor data, a number of passengers in the vehicle, a type of passenger (e.g., an infant, a parent, etc.), etc. In some examples, the input analyzer 206 stores the non-human inputs associated with a specific road and/or route in the database 218. For example, if a road is determined to have a number of potholes, the input analyzer 206 may determine that, each time the autonomous vehicle 100 is driving on that road, the speed is to be decreased. In such an example, the input analyzer 216 can store this command in the database 218 to prevent high speeds on this road if the autonomous vehicle 100 drives on it again. In some examples, the adjustments to the parameters of the autonomous driving software are based on both human and non-human inputs.

In some examples, the input analyzer 206 uses insurance information as another type of non-human input. For example, the insurance information can be input into the driver interface 106 and/or accessed by the controller 102 (e.g., from a server). Information from the insurance policy associated with the autonomous vehicle 100 can be used by the input analyzer 206 to determine adjustments to the autonomous driving software to conform driving characteristics of the autonomous vehicle 100 to the insurance policy. For example, if the insurance policy has a safe driving discount or other incentives for driving in a particular manner, the input analyzer 206 can adjust a parameter or parameters of the autonomous driving software to ensure that the autonomous vehicle 100 drives in a manner that stays within the requirements of the insurance policy agreement.

The example input analyzer 206 can use the inputs to determine adjustments to a variety of parameters of the autonomous driving software. For example, the input analyzer 206 can determine that adjustments are to be made to a speed of the autonomous vehicle 100, an acceleration rate of the autonomous vehicle 100, a braking or stopping distance of the autonomous vehicle 100, a following distance of the autonomous vehicle 100, an aggressiveness level, steering characteristics of the autonomous vehicle 100, and/or any other characteristic of how the autonomous vehicle 100 drives. In some examples, the adjustments determined by the input analyzer 206 are dependent on a location and/or a road type (e.g., highway, interstate, country road, etc.). For example, the input analyzer 206 can determine an adjustment to the autonomous driving software when the autonomous vehicle 100 is driving on a specific road (e.g., a road with a rough driving surface).

In some examples, the input analyzer 206 determines adjustments to the speed to the autonomous vehicle 100. For example, the input analyzer 206 may determine that the autonomous vehicle 100 is to drive at a slower speed (e.g., relative to a speed limit) when an infant is detected to be in the autonomous vehicle 100 or when an elderly person is a passenger in the autonomous vehicle 100 (e.g., using facial recognition). Additionally or alternatively, the input analyzer 206 may receive an input that indicates that the driving surface is rough and, in response, can adjust the autonomous driving software to reduce speed to subsequently reduce wear on a suspension system of the autonomous vehicle 100.

In some examples, the input analyzer 206 can determine that a rate of acceleration and/or deceleration is to be increased or decreased by adjusting a parameter in the autonomous driving software. For example, the input analyzer 206 may determine that the acceleration rate of the autonomous vehicle 100 is to increase based on a voice command input from an operator of the autonomous vehicle 100 or from a detection that the autonomous vehicle 100 is driving on an interstate. Additionally or alternatively, the input analyzer 206 may increase or decrease an aggressiveness level of the autonomous vehicle 100 based on inputs the input analyzer 206 receives. For example, the input analyzer may increase the aggressiveness level of the autonomous vehicle 100 when the operator of the autonomous vehicle 100 is in the autonomous vehicle 100 alone and may decrease the aggressiveness level of the autonomous vehicle 100 when other passengers are present. In such examples, the input analyzer 206 increases or decreases the aggressiveness level by adjusting several parameters of the autonomous driving software, such as speed relative to a speed limit, acceleration rates, following distance, passing distance (e.g., distance after passing another vehicle that that autonomous vehicle 100 returns to its original lane), braking distance, and/or other driving characteristics.

In the illustrated example, the category determiner 208 defines categories for adjustments to the autonomous driving software. For example, the category determiner 208 can define categories for the adjustments that correspond to pieces (e.g., a parameter or group of parameters) of the autonomous driving software. The categories determined by the category determiner 208 thus indicate the piece of software or parameter of the software that is to be adjusted based on an input.

In some examples, the category determiner 208 can define categories based on driving characteristics. For example, the category determiner 208 can define categories for "speed," "acceleration," "steering," "braking," and/or any additional or alternative driving characteristics. Additionally or alternatively, the category determiner 208 can define categories such as "performance," "comfort," "safety," etc., that indicate what change an operator and/or passengers of the autonomous vehicle 100 will experience. When the categories are determined, the category determiner 208 can categorize inputs received at the controller 102 (e.g., by the sensors 104 and the driver input interface 204) that are used by the input analyzer 206 to determine adjustments to the autonomous driving software.

In the illustrated example, the priority determiner 210 determines a priority level of the adjustment(s) determined by the input analyzer 206. In some examples, the priority level is defined qualitatively (e.g., low, medium, and high priority levels). Alternatively, in some examples, the priority level is defined by a numerical value, such as on a scale from one to ten. The priority determiner 210 can also define the priority level as a relative value. For example, the priority determiner 210 can examine the inputs and the associated adjustments determined by the input analyzer 206 and can then determine an ordering of the adjustments based on which adjustments should be given higher priority than others. In such an example, the priority determiner 210 can put the adjustments in an order from highest priority to lowest priority so that the highest priority adjustments are implemented first.

In some examples, the priority determiner 210 assigns a priority level to the adjustments based on a source of the input. For example, a voice command by an adult or by an operator may be given a high priority, while a voice command from a child and/or passenger in a back seat of the autonomous vehicle 100 may be given a low priority. Additionally, an input from an insurance profile may be given a high priority because the driver is to stay within the insurance policy. In some examples, the priority determiner 210 may determine that a higher priority is given to explicit inputs (e.g., voice commands) than to implicit inputs (e.g., facial recognition).

In some examples, the priority determiner 210 determines a priority of an adjustment based on a category of the adjustment. For example, the priority of an adjustment may depend on whether the adjustment is to the speed of the autonomous vehicle 100, acceleration of the autonomous vehicle 100, steering of the autonomous vehicle 100, braking of the autonomous vehicle 100, or some other category. In such an example, the priority determiner 210 may, for example, give adjustments to braking a higher priority than adjustments to speed or acceleration. In some examples, the priority determiner 210 can assign higher priority levels to adjustments based on whether the adjustments change safety of the autonomous vehicle 100, comfort of the autonomous vehicle 100, enjoyment of the autonomous vehicle 100, etc. For example, adjustments that increase safety of the autonomous vehicle 100 may be given a higher priority than adjustments that increase enjoyment or comfort of the autonomous vehicle 100.

In some examples, the priority determiner 210 assigns a priority level to adjustments based on whether the adjustments cause minor or major changes to the autonomous vehicle 100. For example, the priority determiner 210 may give higher priority to major changes to the autonomous driving software than minor changes. In some examples, the priority determiner 210 can assign a high priority to an adjustment that is to be implemented immediately, such as in the case of an emergency. In some such examples, the priority determiner 210 assigns a lower priority level to adjustments that are not time-sensitive or are not to be implemented immediately.

In the illustrated example, the program adjuster 212 uses information from the input analyzer 206, the category determiner 208, and the priority determiner 210 to implement the adjustment to the autonomous driving software. The program adjuster 212 of the illustrated example can identify which parameter of the autonomous driving software is to be adjusted based on information from the input analyzer 206 and the category determiner 208. For example, the program adjuster 212 receives information about the desired adjustment from the input analyzer 206 and a category for the adjustment from the category determiner 208. Based on this information, the example program adjuster 212 determines which parameter of the autonomous driving software is to be changed.

Further, the program adjuster 212 of the illustrated example determines the extent to which the parameter of the autonomous driving software is to be altered by the adjustment. In some examples, the program adjuster 212 determines the extent of change to a parameter based on a value of an input or inputs received at the input analyzer 206. For example, the program adjuster 212 may determine whether a small or large change is to be made to a parameter associated with the speed of the autonomous vehicle 100 based on values of inputs or a certain combination of inputs (e.g., voice commands and facial recognition information indicating passengers are frightened by the high speed of driving and request lower speeds).

In the illustrated example, the program adjuster 212 analyzes the priority level of the adjustment to determine when or if the adjustment to the autonomous driving software is to be made. In some examples, the program adjuster 212 determines that the adjustment is to be made only when the adjustment is given high priority by the priority determiner 210. For example, the program adjuster 212 may not implement an adjustment having a low or medium priority level but will implement other adjustments that have high priority levels. In some alternative examples, the program adjuster 212 can implement an adjustment when a priority level associated with the adjustment meets a threshold (e.g., when using a scale of one to ten for priority). For example, a priority threshold of seven may be set by the program adjuster 212, and the adjustments determined by the priority determiner 210 to have scores of seven or above may be implemented. Additionally or alternatively, the priority threshold can be set to another priority level or priority score (e.g., a priority score of 5 out of ten, a priority score of 8 out of ten, etc.).

In some examples, the program adjuster 212 implements adjustments in order of priority. For example, the program adjuster 212 may implement adjustments in descending order of priority (e.g., implementing adjustments with priority levels of ten, adjustments with priority levels of nine, and so on). Additionally or alternatively, the program adjuster 212 may implement all adjustments with a high priority before moving to adjustments with a medium priority, and then to adjustments having a low priority. In some such examples, the program adjuster 212 implements all of the adjustments as long as the adjustments are implemented in descending order of priority.

In some examples, the program adjuster 212 determines whether an adjustment or adjustments are to be made immediately or whether the program adjuster 212 is to wait to implement the adjustment or adjustments. In some examples, the program adjuster 212 determines whether the adjustment or adjustments are to be made immediately based on the priority level of the adjustment or adjustments. In some such examples, the program adjuster 212 implements adjustments that have a high priority immediately, but waits to implement those adjustments having medium or low priority. For example, for low or medium priority adjustments, the program adjuster 212 may make adjustments to the autonomous driving software when the car is not in operation or may wait until a certain time (e.g., night) to make the adjustments. Alternatively, the program adjuster 212 may implement high priority adjustments immediately when the adjustments are certified. In some alternative examples, the program adjuster 212 can implement adjustments having a low and/or medium priority level immediately.

In some examples, the program adjuster 212 determines that an adjustment or adjustments are to be implemented immediately when the adjustment or adjustments have a particular purpose, such as safety. For example, when an adjustment is to be implemented that improves safety of the autonomous vehicle 100, the program adjuster 212 may implement the adjustment immediately. Additionally or alternatively, the program adjuster 212 may implement the adjustment or adjustments to the autonomous driving software immediately when the adjustment or adjustments are being implemented to address an emergency situation.

The program adjuster 212 of the illustrated example further implements the change to the autonomous driving software when particular conditions are met. For example, the program adjuster 212 waits to implement the change to the autonomous driving software until the adjustment is approved by the example adjustment evaluator 216 and an example certification analyzer 222, as discussed in more detail below. When the adjustment to the autonomous driving software is authorized, the program adjuster 212 can implement the adjustment to alter the driving characteristics of the autonomous vehicle 100.

In some alternative examples, the program adjuster 212 can implement the adjustment to the autonomous driving software without authorization from the adjustment evaluator 216 and the certification analyzer 222. For example, the program adjuster 212 may be able to implement the change without authorization when the adjustment is given a high priority by the priority determiner 208. In some examples, the priority level of the adjustment must meet a threshold to be implemented without authorization. Additionally or alternatively, the adjustment to the autonomous driving software may be implemented without authorization when the adjustment is directed to providing safety or preventing an emergency situation (e.g., a collision). In some examples, the program adjuster 212 can implement the adjustment (e.g., given one of the scenarios above) but requests authorization from the adjustment evaluator 216 and/or the certification analyzer 222 after the adjustment has been implemented. If the adjustment is subsequently authorized, the adjustment is maintained by the program adjuster 212. On the other hand, if the adjustment is subsequently not authorized, the program adjuster 212 removes the adjustment and the autonomous driving software returns to a previous version of the software.

In the illustrated example, the adjustment evaluator 216 evaluates a potential adjustment to the autonomous driving software that is to be implemented by the program adjuster 212. In some examples, the adjustment evaluator 216 performs the evaluation of the adjustment at the controller 102 (e.g., using processing power of the autonomous vehicle 100). Alternatively, in some examples, the adjustment evaluator 216 determines that the evaluation is to be performed by an example server-side adjustment evaluator 224 or other outside processing entity. For example, the adjustment evaluator 216 can determine that information regarding the adjustment is to be transmitted from the server interface 220 to the server-side adjustment evaluator 224 via a network 226.

In some examples, the adjustment evaluator 216 determines whether to perform the evaluation or to have the evaluation performed at the server-side adjustment evaluator 224 based on how much processing power is required to evaluate the adjustment. For example, when a small adjustment is to be made to the autonomous driving software, the adjustment evaluation 216 can perform the evaluation (e.g., because the evaluation can be performed using the more limited processing power of the autonomous vehicle 100). Alternatively, when a large adjustment is to be made to the autonomous driving software, the adjustment evaluator 216 may determine that more processing power is to be used and may request that the server interface 220 send the information to the server-side adjustment evaluator 224. In some examples, the adjustment evaluator 216 is to transmit all evaluations to the server-side adjustment evaluator 224 to be performed.

In some examples, the adjustment evaluator 216 and/or the server-side adjustment evaluator 224 evaluate the adjustment to the autonomous driving software by simulating the adjustment (e.g., using simulation software). In such examples, the adjustment evaluator 216 and/or the server-side adjustment evaluator 224 can analyze outputs from the simulation to determine whether the adjustment can be made to the autonomous driving software. The adjustment evaluator 216 and/or the server-side adjustment evaluator 224 can determine whether the adjustment can be made based on whether the results of the adjustment cause the autonomous vehicle 100 to perform an action that is illegal, reduce safety (e.g., below an acceptable level), cause damage to another system or systems of the autonomous vehicle 100, and/or other undesirable results. For example, if an output from a simulation does not allow the autonomous vehicle 100 to stop in time for a red light (e.g., because a braking distance is reduced), the adjustment evaluator 216 and/or the server-side adjustment evaluator 224 can prevent the adjustment from occurring. On the other hand, when a simulation of an adjustment is performed, and the output indicates that no potential reductions in safety or vehicle performance, the adjustment evaluator 216 and/or the server-side adjustment evaluator 224 can allow the adjustment.

In some examples, the adjustment evaluator 216 can notify an operator of the autonomous vehicle 100 when an adjustment to the driving software is to be verified by the operator. For example, when an adjustment is determined to be legal, not reduce safety, etc., but the results of testing the adjustment indicate that the adjustment may reduce comfort or performance, the adjustment evaluator 216 can transmit a message to the driver interface 106 via the driver input interface 204. In some such examples, the operator can confirm or decline the adjustment to the autonomous driving software by inputting commands into the driver interface 106.

The program adjuster 212 of the illustrated example is further to request that the adjustment be certified. For example, the adjustment to the autonomous driving software is to be checked against an organizational standards, such as a standard set by the NHTSA, an OEM of the vehicle, or another organization that regulates what driving behaviors or characteristics are allowed for the autonomous vehicle 100. In the illustrated example, the adjustment to be implemented by the program adjuster 212 is transmitted from the server interface 220 to the certification analyzer 222 via the network 226 to determine whether the adjustment can be certified. The certification analyzer 222 can compare the adjustment and/or the updated autonomous driving software to one or more organizational standards to ensure that the autonomous driving software remains in compliance with the organizational standards when updates occur. In some examples, the certification analyzer 222 uses a machine learning model to determine whether the adjustment to the autonomous driving software can be certified. Additionally alternatively, the certification analyzer 222 can request input from a human to determine that an adjustment can be certified or to confirm that an adjustment is to be certified. The certification analyzer 222 is discussed in more detail in connection with FIG. 3.

In the illustrated example, the profile analyzer 214 can analyze a profile of an operator of the autonomous vehicle 100 or a passenger of the autonomous vehicle 100. In some examples, the profile includes driving characteristics or preferences of the operator or passenger that can be detected by the profile analyzer 214. For example, the profile analyzer 214 can determine changes to the autonomous driving software by analyzing preferences included in the profile and determining that the autonomous driving software is to be changed to align with those preferences.

In some examples, the profile analyzer 214 detects multiple profiles within the autonomous vehicle 100 and determines whether any preferences in the profiles are conflicting. When conflicts between profiles are detected, the profile analyzer 214 determines which preference is to be used for the autonomous driving software. In some examples, the profile analyzer 214 determines which preference to use based on a comparison of the priority level of the preferences and selecting the preference with the higher priority level. Additionally or alternatively, the profile analyzer 214 can select a driving preference based on which driving preference is less aggressive, which driving preference creates the safest environment, etc. In some examples, the profile analyzer 214 selects a driving preference based on who the profile is associated with. For example, the profile analyzer 214 may select the driving preferences of an older passenger as opposed to a young or middle-aged passenger.

In some examples, the autonomous vehicle 100 is an autonomous ride-hailing vehicle (e.g., an autonomous taxi). In such examples, the autonomous ride-hailing vehicle may pick up and drop off passengers throughout operation of the autonomous ride-hailing vehicle. During operation of the autonomous ride-hailing vehicle, the profile analyzer 214 analyzes the profiles associated with passengers and can determine adjustments to the autonomous driving software based on the profiles. In some examples, the autonomous driving software can change with each new passenger. For example, when a first passenger enters the autonomous ride-hailing vehicle, the autonomous driving software can be adjusted based on the driving characteristics determined by the profile analyzer 214 from the profile of the first passenger. In such an example, the profile analyzer 214 can compare a profile of a second passenger when the second passenger is picked up by the autonomous ride-hailing vehicle. The profile analyzer 214 is then to determine if any conflicts are present between the first passenger profile and the second passenger profile. If no conflicts are detected, the autonomous driving software remains the same and no adjustments are made.

However, if the first and second profiles have conflicting driving characteristics, the profile analyzer 214 determines which driving characteristics are to be adhered to (e.g., as explained above). If the driving characteristics of the first passenger are to be used, no changes are made to the autonomous driving software, while adjustments are made to the autonomous driving software if it is determined that the driving characteristics of the second passenger are to be followed. In some examples, the profile analyzer 214 can select driving characteristics from both the first and second profiles, thus combining driving preferences. Further, when the first passenger exits the autonomous ride-hailing vehicle, the profile analyzer 214 determines that the driving characteristics of the second passenger are to be adhered to and may adjust the autonomous driving software accordingly. The profile analyzer 214 continues to adjust the autonomous driving software as new passengers enter autonomous ride-hailing vehicle and other passengers leave the autonomous ride-hailing vehicle.

While an example manner of implementing the controller 102 of FIG. 1 is illustrated in FIG. 2, one or more of the elements, processes and/or devices illustrated in FIG. 2 may be combined, divided, re-arranged, omitted, eliminated and/or implemented in any other way. Further, the example sensor interface 202, the example driver input interface 204, the example input analyzer 206, the example category determiner 208, the example priority determiner 210, the example program adjuster 212, the example profile analyzer 214, the example adjustment evaluator 216, the example database 218, the example server interface 220 and/or, more generally, the example controller 102 of FIG. 2 may be implemented by hardware, software, firmware and/or any combination of hardware, software and/or firmware. Thus, for example, any of the example sensor interface 202, the example driver input interface 204, the example input analyzer 206, the example category determiner 208, the example priority determiner 210, the example program adjuster 212, the example profile analyzer 214, the example adjustment evaluator 216, the example database 218, the example server interface 220 and/or, more generally, the example controller 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 202, the example driver input interface 204, the example input analyzer 206, the example category determiner 208, the example priority determiner 210, the example program adjuster 212, the example profile analyzer 214, the example adjustment evaluator 216, the example database 218, the example server interface 220, and/or, more generally, the controller 102 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 102 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
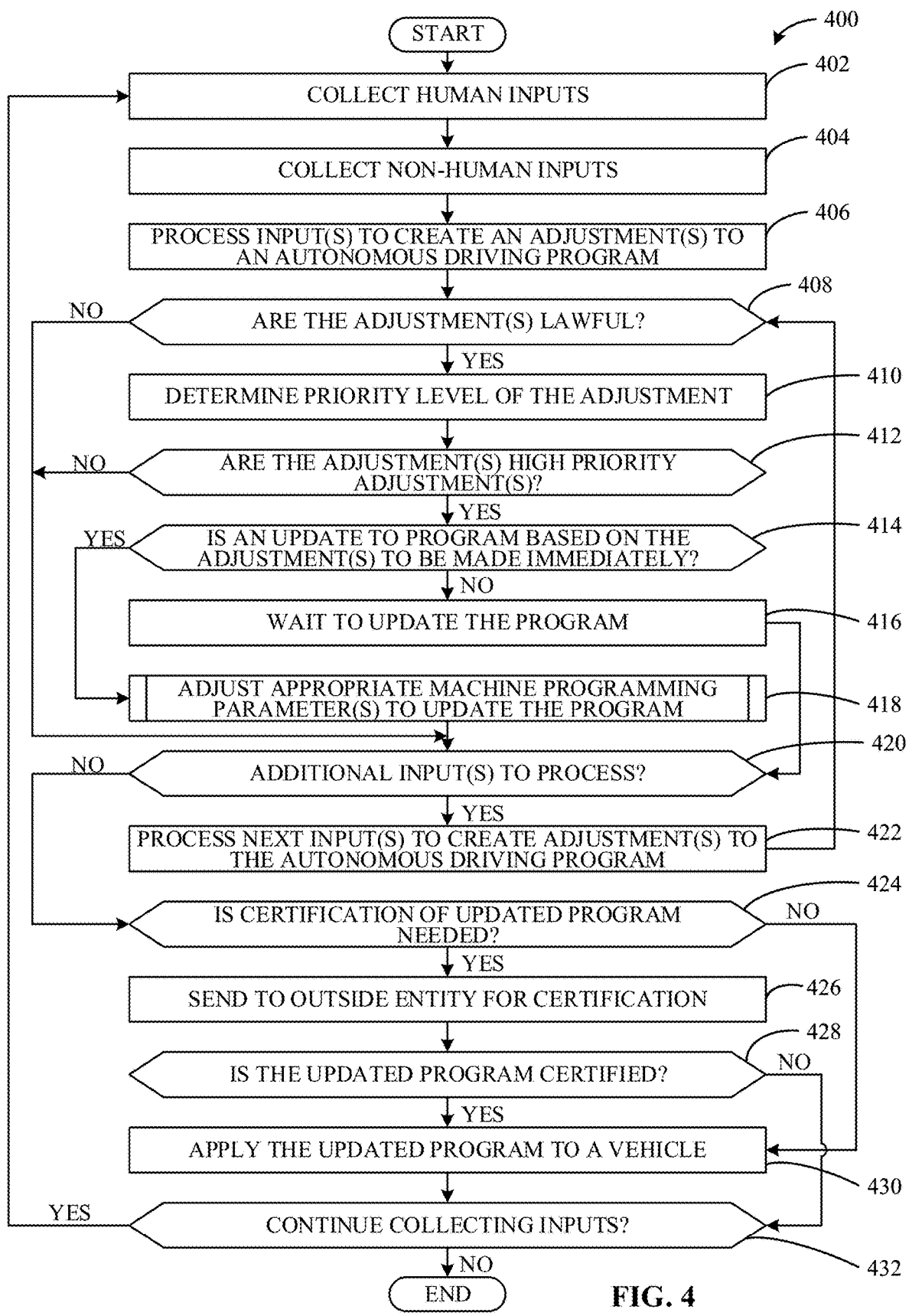
FIG. 4 is a flowchart representative of machine readable instructions which may be executed to implement the example controller of FIGS. 1 and/or 2 to adjust autonomous driving software of the example autonomous vehicle of FIG. 1.
Figure 5:
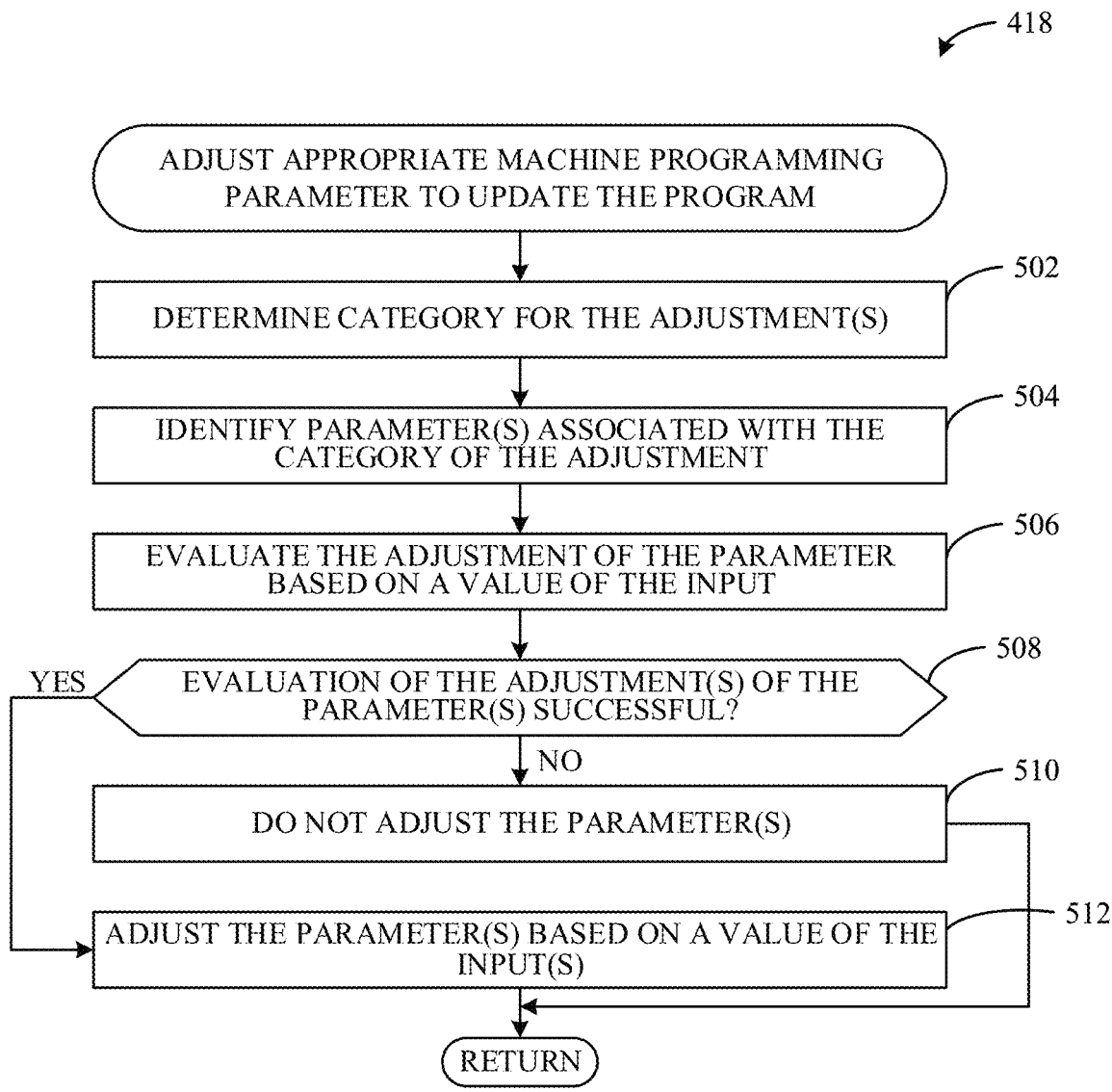
FIG. 5 is a flowchart representative of machine readable instructions which may be executed to implement the example controller of FIGS. 1 and/or 2 to adjust an appropriate machine programming parameter to update autonomous driving software of the example autonomous vehicle of FIG. 1.
Figure 6:
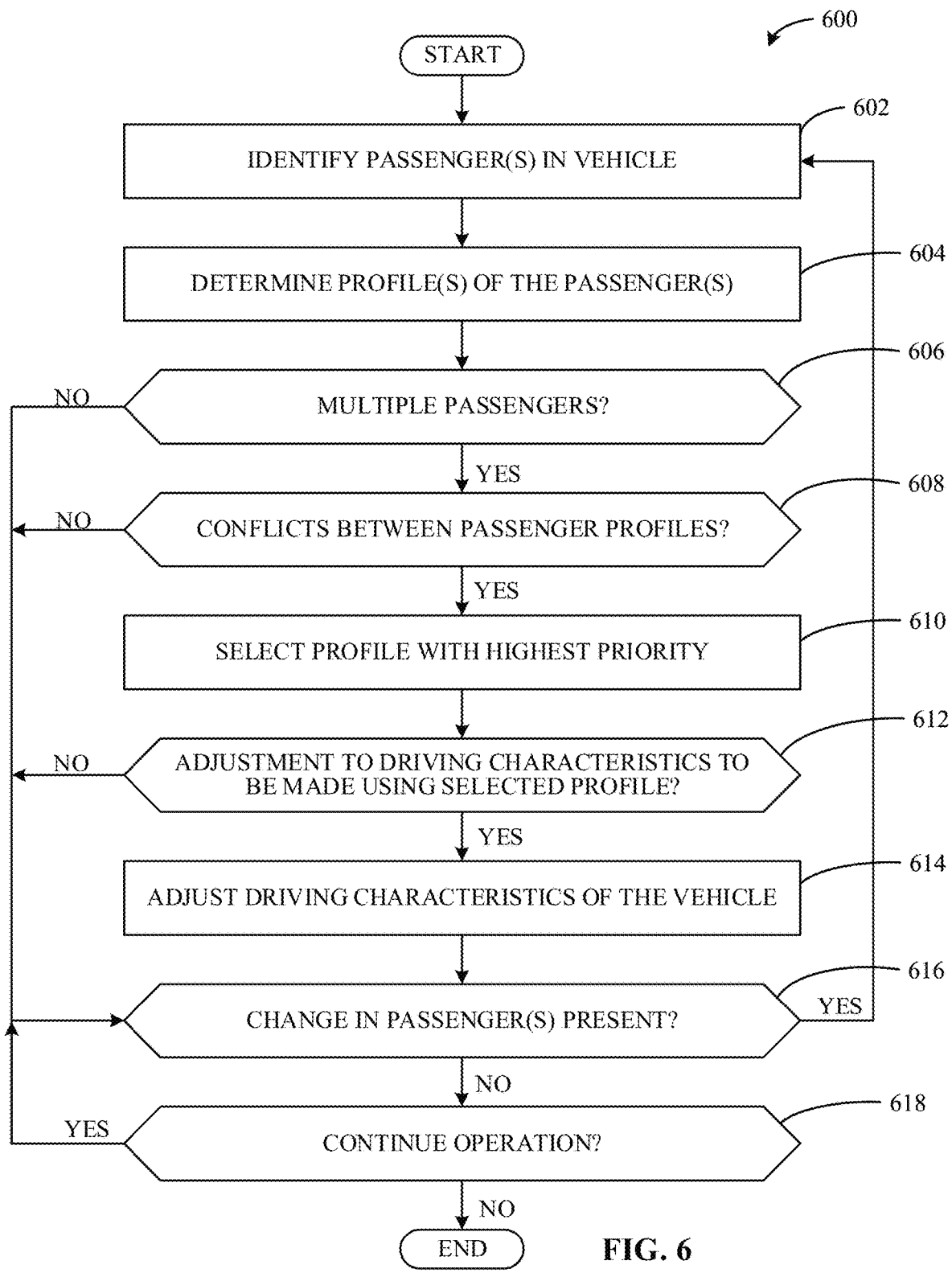
FIG. 6 is a flowchart representative of machine readable instructions which may be executed to implement the example controller of FIGS. 1 and/or 2 to adjust driving characteristics based on passenger profiles.

Flowcharts representative of example hardware logic, machine readable instructions, hardware implemented state machines, and/or any combination thereof for implementing the controller 102 of FIGS. 1 and/or 2 are shown in FIGS. 4-6. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 4-6, many other methods of implementing the example controller 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 3:
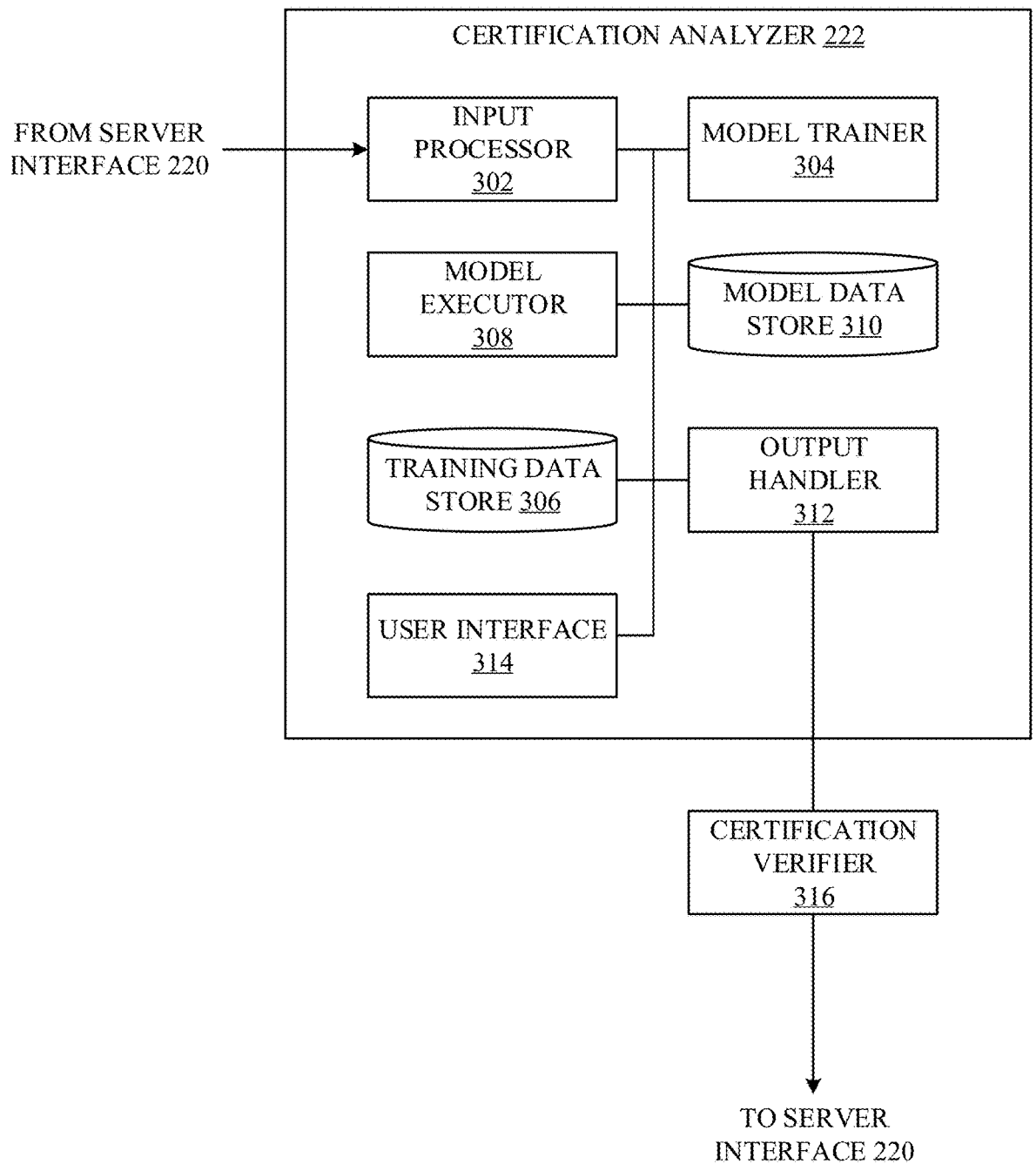
FIG. 3 is a block diagram of the example certification analyzer of FIG. 2.

FIG. 3 is a block diagram of the example certification analyzer 222 of FIG. 2. In the illustrated example of FIG. 3, the certification analyzer 222 includes an input processor 302, a model trainer 304, a training data store 306, a model executor 308, a model data store 310, an output handler 312, and a user interface 314. As noted above, Artificial intelligence (AI), including machine learning (ML), deep learning (DL), and/or other artificial machine-driven logic, enables machines (e.g., computers, logic circuits, etc.) to use a model to process autonomous driving programs and/or metadata associated therewith to determine whether a given autonomous driving program is to be certified (e.g., allowed) or denied (e.g., disallowed).

Many different types of machine learning models and/or machine learning architectures exist. In examples disclosed herein, a convolutional neural network (CNN) model is used. Using a CNN model enables efficient classifications of an input (e.g., an autonomous driving program and/or metadata associated therewith) to be classified as valid or invalid. However, other types of machine learning models could additionally or alternatively be used such as, for example, a support vector machine (SVM), a recurrent neural network (RNN), etc.

In general, implementing a ML/AI system involves two phases, a learning/training phase and an inference/operational phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed until an error threshold is reached. In examples disclosed herein, training is performed at the certification analyzer 222. Training is performed using hyperparameters that control how the learning is performed (e.g., a learning rate, a number of layers to be used in the machine learning model, etc.). In some examples re-training may be performed. Such re-training may be performed in response to additional training data becoming available, a threshold amount of time elapsing since a prior training, etc.

Training is performed using training data. In examples disclosed herein, the training data originates from autonomous driving programs (and/or metadata associated therewith) and past labels of whether such autonomous driving programs are valid (e.g., human validations of prior autonomous driving programs). Because supervised training is used, the training data is labeled. Labeling is applied to the training data by a human who has confirmed whether the autonomous driving program is to be certified (e.g., is valid or not).

Once training is complete, the model is deployed for use as an executable construct that processes an input and provides an output based on the network of nodes and connections defined in the model. The model is stored at the certification analyzer 222. The model may then be executed by the certification analyzer 222 to determine whether a received autonomous driving program is to be certified.

Once trained, the deployed model may be operated in an inference phase to process data. In the inference phase, data to be analyzed (e.g., live data such as an autonomous driving program and/or metadata associated therewith received from the controller 102) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In operation, the certification analyzer 222 of the illustrated example executes a training phase and an operating phase. During the training phase, the example input processor 302 receives a dataset and stores the dataset in the training data store 306. In some examples, the dataset includes example autonomous driving programs and/or metadata associated therewith (e.g., inputs that emulate potential inputs from the sensors 104 or driver interface 106 of FIGS. 1 and/or 2) and labeled outputs of validation scores and/or certification information. The example model trainer 304 accesses the dataset from the training data store 306 and parameters of a machine learning model from the model data store 310. In the illustrated example, the model trainer 304 uses the dataset to train the machine learning model that is stored in the model data store 310.

When the machine learning model has been trained by the model trainer 304, the certification analyzer 222 enters into the operational phase. In the operational phase, the input processor 302 receives an updated autonomous driving program or a portion of the updated autonomous driving program that is to be certified or not certified by the machine learning model. The example input processor 302 provides the updated autonomous driving program to the model executor 308 to determine whether the updated autonomous driving program can be certified.

The model executor 308, using the model stored in the model data store, generates a validation score for the updated autonomous driving program. For example, the model executor 308 can generate a validation score that indicates a level of confidence as to whether the updated autonomous driving program meets the standards set forth by one or more organizations, such as NHTSA, an OEM, or other organization. In some examples, the validation score is a score between 0 and 1 (e.g., where 0 is no confidence and 1 is complete confidence) or a percentage between 0% and 100%. The validation score is then used by the model executor 308 to determine whether the updated autonomous driving program can be certified.

In some examples, the model executor 308 compares the validation score to one or more thresholds to determine whether the updated autonomous driving program is to be certified. For example, the model executor 308 can create three validation score zones divided by two threshold values. In such an example, the model executor 308 compares the validation score to a first threshold value. In some examples, the first threshold value indicates a high confidence that the updated autonomous driving program is to be certified. For example, the first threshold value can be a value of 0.75, 0.8, 0.9, etc. When the validation score meets the first threshold value, the model executor 308 determines that the updated autonomous driving program is to be certified. The example output handler 312 is then to output an indication that the updated autonomous driving program is certified.

When the validation score is below the first threshold value, the model executor 308 can compare the validation score to a second threshold. In some examples, the second threshold value is less than the first threshold value. For example, the second threshold value can be a value of 0.4, 0.5, 0.6, etc. When the model executor 308 determines that the validation score is below the second threshold value, the model executor 308 can indicate that the updated autonomous driving program is to be denied certification. In such examples, the output handler 312 can output the decision to deny certification of the updated autonomous driving program. In some examples, the output handler 312 transmits the decision to the server interface 220 of FIG. 2.

The example model executor 308 can determine that a user (e.g., an employee of an entity operating the certification analyzer 222) is to assist in the decision of whether to certify the updated autonomous driving program when the validation score is below the first threshold but meets the second threshold. The user interface 314 allows the user to access information about the updated autonomous driving program and/or the validation score. The user can then input a response or decision into the user interface 314 to indicate whether the updated autonomous driving program is to be certified. The model executor 308 can receive the input or inputs into the user interface 314 and determine whether to certify the updated autonomous driving program.

The example model executor 308 can alternatively determine whether to certify the updated autonomous driving program by comparing the validation score to a single threshold value. When the validation score meets the threshold value, the model executor 308 approves the updated autonomous driving program. On the other hand, the model executor 308 can deny certification when the validation score is below the threshold value. Alternatively, the model executor 308 can determine whether or not to certify the updated autonomous driving program based on other criteria.

The output handler 312 of the illustrated example outputs the determination of the model executor 308 to the server interface 220 of the controller 102. In some examples, the output handler 312 additionally outputs the determinations to the model data store 310. In some examples, the model trainer 304 uses the determinations of the model executor 308 to further train the machine learning model. For example, the model trainer 304 can adjust the parameters of the machine learning model based on the determinations of the model executor 308.

While an example manner of implementing the certification analyzer 222 of FIG. 2 is illustrated in FIG. 3, one or more of the elements, processes and/or devices illustrated in FIG. 3 may be combined, divided, re-arranged, omitted, eliminated and/or implemented in any other way. Further, the example input processor 302, the example model trainer 304, the example training data store 306, the example model executor 308, the example model data store 310, the example output handler 312, the example user interface 314, and/or, more generally, the example certification analyzer 222 of FIG. 3 may be implemented by hardware, software, firmware and/or any combination of hardware, software and/or firmware. Thus, for example, any of the example input processor 302, the example model trainer 304, the example training data store 306, the example model executor 308, the example model data store 310, the example output handler 312, the example user interface 314, and/or, more generally, the example certification analyzer 222 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input processor 302, the example model trainer 304, the example training data store 306, the example model executor 308, the example model data store 310, the example output handler 312, the example user interface 314, and/or, more generally, the example certification analyzer 222 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example certification analyzer 222 of FIG. 2 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
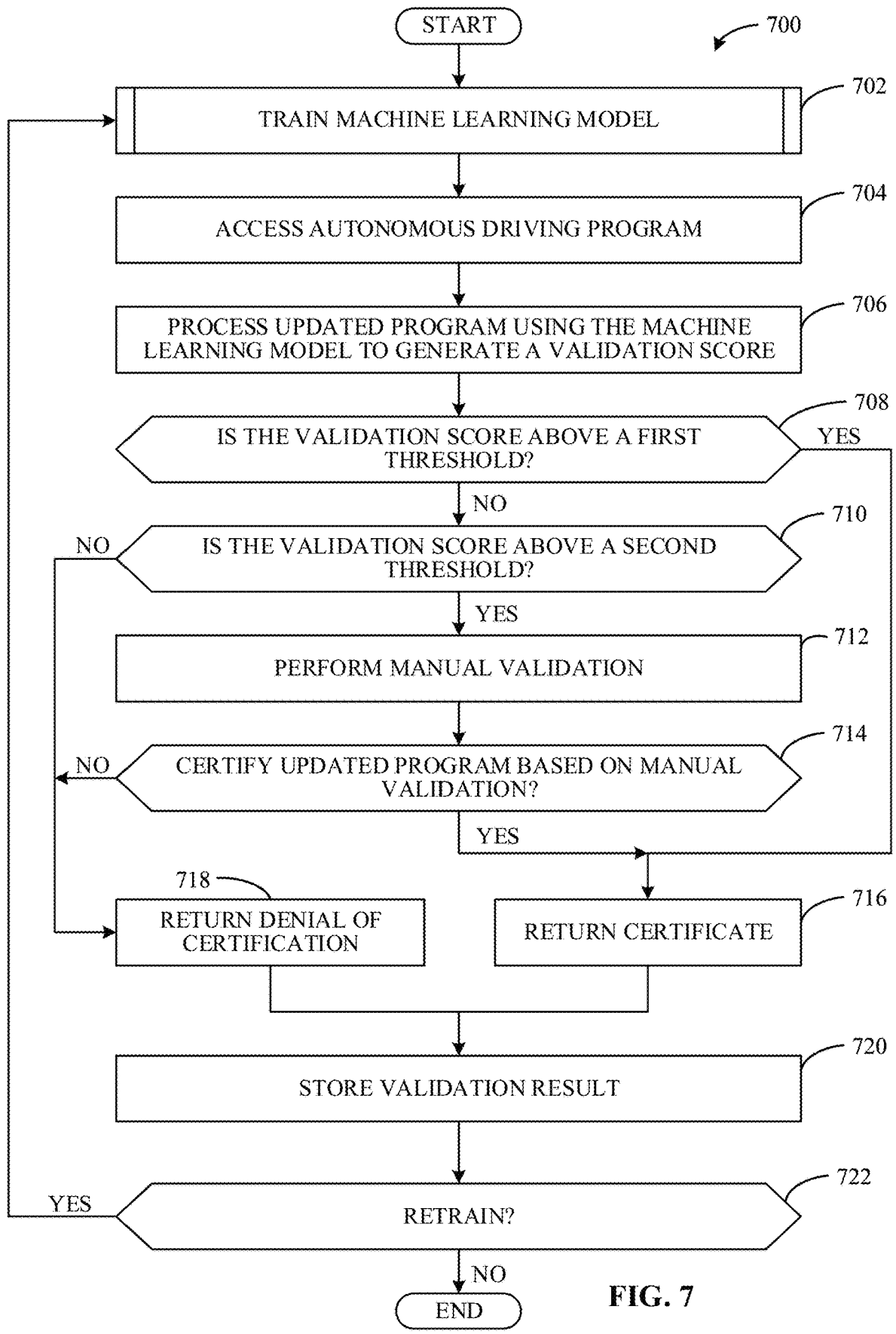
FIG. 7 is a flowchart representative of machine readable instructions which may be executed to implement the example certification analyzer of FIGS. 2 and/or 3 to determine whether autonomous driving software is to be certified.
Figure 8:
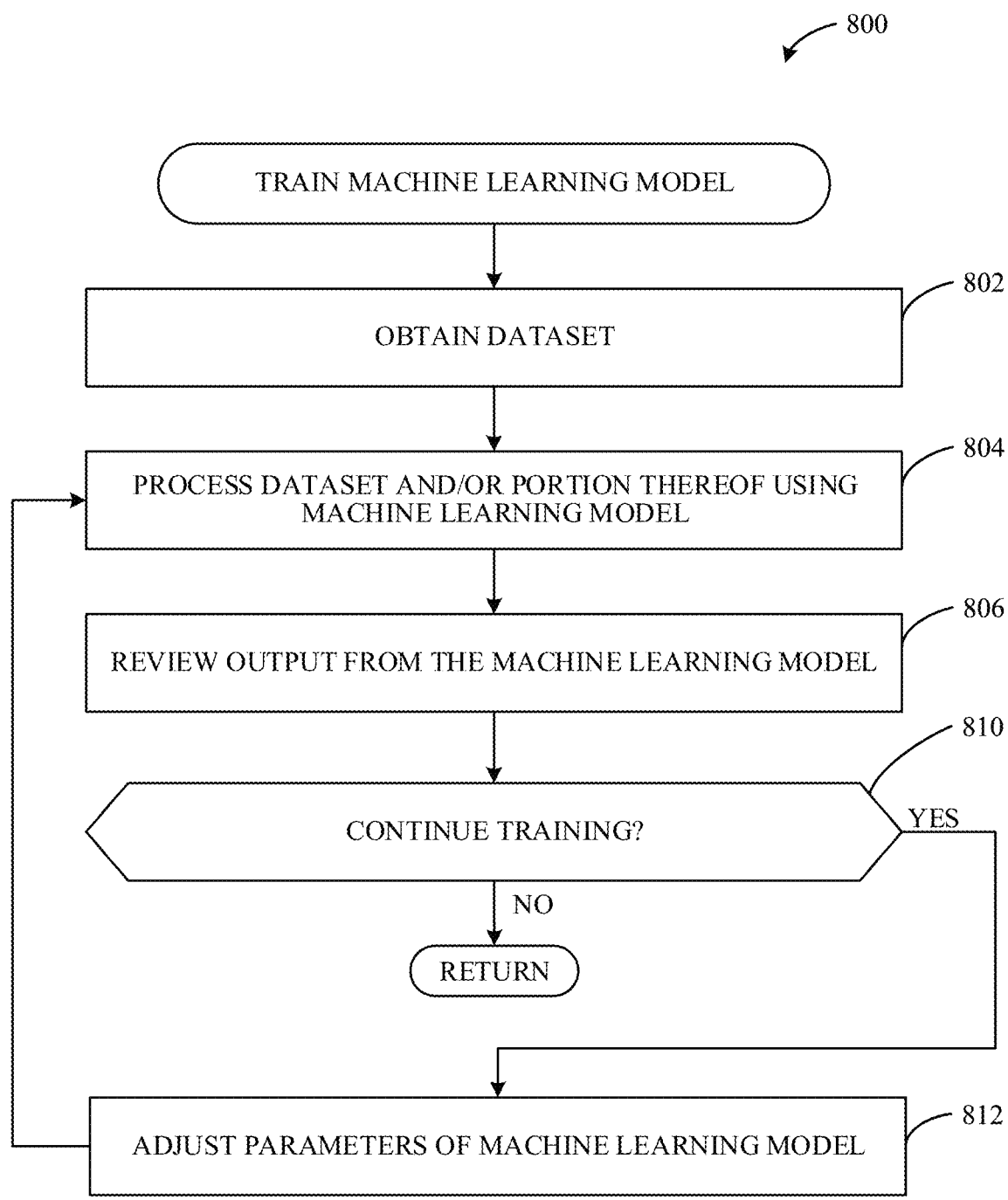
FIG. 8 is a flowchart representative of machine readable instructions which may be executed to implement the example certification analyzer of FIGS. 2 and/or 3 to train a machine learning model.

Flowcharts representative of example hardware logic, machine readable instructions, hardware implemented state machines, and/or any combination thereof for implementing the certification analyzer 222 of FIGS. 2 and/or 3 are shown in FIGS. 7 and 8. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 4, many other methods of implementing the example certification analyzer 222 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 7 and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine readable instructions which may be executed to implement the example controller 102 of FIGS. 1 and/or 2 to adjust autonomous driving software of the example autonomous vehicle 100 of FIG. 1. The example program 400 begins at block 402 where the controller 102 collects human inputs. For example, the sensor interface 202 can obtain human inputs from sensor data of the sensors 104 (e.g., facial recognition, voice commands, etc.) and the driver input interface 204 can obtain human inputs from the driver interface 106 (e.g., commands input into a user interface of the driver interface 106).

The controller 102 collects non-human inputs. (Block 404). In examples disclosed herein, the sensor interface 202 obtains non-human inputs from the example sensors 104 (e.g., driving surface conditions from ride height data, detection of passengers in the autonomous vehicle 100, etc.). The controller 102 processes the collected input(s) to create adjustment(s) to an autonomous driving program of the autonomous vehicle 100. (Block 406). For example, the input analyzer 206 of FIG. 2 can determine potential adjustments to the autonomous driving program based on the human and non-human inputs obtained by the sensor interface 202 and/or the driver input interface 204.

The controller 102 determines whether the adjustment(s) are lawful. (Block 408). In examples disclosed herein, the adjustment evaluator 216 of FIG. 2 evaluates the adjustment and/or adjustments to the autonomous driving software and determines whether the adjustment(s) violate any laws of the road. In some examples, the laws for a given state can be stored in the database 218, and the adjustment evaluator 216 can review the laws to determine whether the adjustment violates any of the laws. In some examples, when the laws are unknown, the adjustment evaluator 216 can transmit a request to a server via the example server interface 220 to review the adjustment in view of laws of a given state or country (e.g., a locality in which the autonomous vehicle is operating). When the adjustment or adjustments are determined to be lawful, the program 400 proceeds to block 410, while the program proceeds to block 420 when the adjustment is determined to be unlawful.

If the example controller 102 determines that the adjustment(s) are lawful (e.g., block 408 returns a result of YES), the controller 102 determines a priority level of the adjustment(s). (Block 410). For example, the priority determiner 210 can determine one or more priority levels associated with the adjustment or adjustments. In some examples, the priority level is qualitative (e.g., a priority level of low, medium, or high), while in other examples the priority level is a numerical value (e.g., a value on a scale of one to ten). The controller 102 determines whether the adjustment or adjustments are high priority adjustments. (Block 412). In some examples, the program adjuster 212 reviews the priority levels assigned by the priority determiner 210 to determine whether the adjustments have a high priority (and therefore should be implemented). In some examples, the program adjuster 212 proceeds with high priority adjustments only and does not implement low or medium priority level adjustments. In some alternative examples, the program adjuster 212 proceeds with medium or high level adjustments. Alternatively, in some examples, the program adjuster 212 compares the priority level (e.g., on a scale of one to ten) to a threshold and, when the priority level meets the threshold, the program adjuster 212 proceeds with the adjustment. When the adjustment is determined to be a high priority adjustment (e.g., block 412 returns a result of YES), the program 400 proceeds to block 414. On the other hand, when the adjustment is not a high priority adjustment (e.g., block 412 returns a result of NO), the program proceeds to block 420.

At block 414, the controller 102 determines whether the update to a program (e.g., the autonomous driving software) based on the adjustment or adjustments is to be made immediately. (Block 414). For example, the program adjuster 212 determines whether the adjustments are to be made immediately for reasons such as an emergency situation or high priority adjustments. When the adjustment is to be made immediately (e.g., block 414 returns a result of YES), the program 400 proceeds to block 418. When the adjustment is not to be made immediately (e.g., block 414 returns a result of NO), the program 400 instead proceeds to block 416.

The controller 102 is further to wait to update the program (block 416) when the adjustment is not to be made immediately. (Block 414 returns a result of NO). For example, the program adjuster 212 may not implement the adjustment or adjustments immediately and may instead implement the adjustments at another time or may not implement the adjustments at all. In some such examples, the program adjuster 212 waits until higher priority adjustments are implemented before making the next adjustments. In other such examples, the program adjuster 212 may wait until a particular condition is met, such as when the autonomous vehicle 100 is in park, it is nighttime, not additional vehicles are on the same road, etc., before making the adjustment or adjustments.

The controller 102 is further to adjust an appropriate machine programming parameter(s) to update the program (block 418) when the adjustment is to be made immediately (e.g., block 414 returns a result of NO). For example, the program adjuster 212 is to adjust an appropriate parameter of the program to make the intended adjustment to the autonomous driving software. In some such examples, the program adjuster 212 uses information from the input analyzer 206 and the category determiner 208 to determine the correct parameter to adjust and to make the adjustment.

The controller 102 determines whether additional inputs are to be processed. (Block 420). For example, the input analyzer 206 determines that additional inputs have been obtained (e.g., from the sensors 104 or the driver interface 106) or that previously collected inputs remain to be processed. When additional inputs are to be processed (e.g., block 420 returns a result of YES), the example program 400 proceeds to block 422. On the other hand, when no additional inputs are to be processed (e.g., block 420 returns a result of NO), the program 400 proceeds to block 424.

At block 422, the controller 102 processes a next input or inputs to create adjustments to the autonomous driving program. For example, the input analyzer 206 can process any additional inputs and determine potential adjustments to the autonomous driving program based on those inputs. When the input analyzer 206 has processed the additional inputs, the program 400 returns to block 408.

The controller 102 determines whether certification of the updated autonomous driving program is needed. (Block 424). For example, the program adjuster 212 can determine whether to certify the updated program to ensure the newly updated program meets the standards of one or more organizations (e.g., NHTSA, and OEM, etc.). In some examples, the program adjuster 212 uses information from the priority determiner 210 to determine whether certification is needed (e.g., if the adjustment is high priority and is to be implemented immediately). In some examples, the program adjuster 212 determines that the certification is not needed when the adjustment is to be made in response to an emergency situation. The program adjuster 212 typically defaults to requesting that the program be certified prior to applying the updated program to the autonomous vehicle 100. When the program adjuster 212 determines that the updated program is to be certified (e.g., block 424 returns a result of YES), control of the program 400 proceeds to block 426. When the program adjuster 212 determines that the updated program is not to be certified (e.g., block 424 returns a result of NO), control of the program 400 proceeds to block 430.

The controller 102 sends the updated program to an outside entity (e.g., a server) for certification. (Block 426). For example, the program adjuster 212 transmits the updated program to the example certification analyzer 222 of FIG. 2 via the server interface 220 of FIG. 2. The certification analyzer 222 determines whether the updated program is certified, as discussed in connection with FIGS. 3 and/or 7.

The controller 102 determines whether the updated program is certified. (Block 428). For example, the program adjuster 212 receives a response from the certification analyzer 222 as to whether the updated program is certified. Based on the response from the certification analyzer 222, the program 400 either proceeds to block 430 when the updated program is certified (e.g., in response to block 428 returning a result of YES), or proceeds to block 432 when the program is not certified (e.g., in response to block 428 returning a result of NO).

The controller 102 applies the updated program to the autonomous vehicle 100. (Block 430). For example, the program adjuster 212 may implement the adjustment or adjustments to the autonomous driving program so that the autonomous vehicle 100 operates using the updated program. The autonomous vehicle 100 then operates using the updated program until further adjustments are implemented. The controller determines whether to continue collecting inputs. (Block 432). When inputs are still to be collected (e.g., block 432 returns a result of YES), the program 400 returns to block 402. When inputs are not longer to be collected (e.g., block 432 returns a result of NO), the program 400 concludes.

FIG. 5 is a flowchart representative of machine readable instructions which may be executed to implement the example controller 102 of FIGS. 1 and/or 2 to adjust an appropriate machine programming parameter to update autonomous driving software of the example autonomous vehicle 100 of FIG. 1. The example program 418 begins at block 502 where the controller 102 determines a category for the adjustment or adjustments. (Block 502). For example, the category determiner 208 of FIG. 2 can determine a category for each adjustment generated by the input analyzer 206 of FIG. 2. In some examples, the categories are associated with a parameter or group of parameters of the autonomous driving software. The categories can be, for example, driving characteristics such as "speed," "acceleration," "steering," "braking," and/or any additional or alternative driving characteristics. Additionally or alternatively, the category determiner 208 can define categories such as "performance," "comfort," "safety," etc., that indicate what change an operator and/or passengers of the autonomous vehicle 100 will experience.

The controller 102 identifies a parameter or parameters associated with the category of the adjustment. (Block 504). For example, the program adjuster 212 of FIG. 2 can use the category of the adjustment to determine a piece or portion of the autonomous driving software that is to be adjusted. For example, the program adjuster 212 can locate a portion of the autonomous driving software that corresponds to a speed of the autonomous vehicle 100, acceleration rate, following distance, etc.

The controller 102 evaluates the adjustment of the parameter based on a value of the input. (Block 506). For example, the program adjuster 212 may determine an extent that the adjustment changes the autonomous driving program based on the value of the input. The program adjuster 212 then requests that the adjustment evaluator 216 of FIG. 2 perform an evaluation (e.g., a simulation of the adjustment to the autonomous driving program) of the adjustment or adjustments. In some examples, the adjustment evaluator 216 transmits information regarding the adjustment to an outside entity (e.g., a server), such as the server-side adjustment evaluator 224 of FIG. 2, to perform the evaluation.

The controller 102 determines whether the evaluation of the adjustment or adjustments of the parameter or parameters was successful. (Block 508). For example, the adjustment evaluator 216 can generate or receive an output of a simulation of the adjustment or adjustments and determine whether the adjustment or adjustments should be implemented. In some examples, the adjustment evaluator 216 determines that the adjustment is not to be implemented because the simulation results in a dangerous situation, causes damage to a system or systems of the autonomous vehicle 100 (e.g., when block 508 returns a result of NO), violates rules of the road, etc. In such examples, the program 418 proceeds to block 510. In some alternative examples, the adjustment evaluator 216 determines that the adjustment is to be implemented when the output of the simulation obeys the rules of the road, does not reduce safety, does not cause damage to systems of the autonomous vehicle, etc. In such examples (e.g., when block 508 returns a result of YES), the program 418 proceeds to block 512.

If the evaluation of the adjustments of the parameters was not successful (e.g., block 508 returns a result of NO), the controller 102 does not adjust the parameter or parameters of the autonomous driving program. (Block 510) For example, when the evaluation is unsuccessful (e.g., in response to block 508 returning a result of NO), the parameter or parameters corresponding to the adjustment or adjustments are not implemented, and program 418 concludes.

If the evaluation of the adjustments of the parameters was successful (e.g., block 508 returns a result of YES), the controller 102 adjusts the parameter or parameters based on a value of the input or inputs. (Block 512). For example, the program adjuster 212 implements the adjustment or adjustments to the autonomous driving program when the evaluation is successful (e.g., in response to block 508 returning a result of YES). In such examples, the program adjuster 212 can implement the adjustment based on a value of the input (e.g., the same value used in the evaluation of block 506). Once the adjustment or adjustments have been implemented, the program 418 concludes.

FIG. 6 is a flowchart representative of machine readable instructions which may be executed to implement the example controller 102 of FIGS. 1 and/or 2 to adjust driving characteristics based on passenger profiles. The example program 600 begins with the controller 102 identifying a passenger or passengers in a vehicle (e.g., the autonomous vehicle 100 of FIG. 1). (Block 602). In some examples, the vehicle is an autonomous ride-sharing vehicle. For example, the profile analyzer 214 of FIG. 2 can identify passengers that entered into the autonomous ride-sharing vehicle by connecting to an application on mobiles phones of the passengers. In some examples, the passengers have a profile associated with the application that can be accessed by the profile analyzer 214 to identify the passengers.

The controller 102 determines the profile or profiles of the passenger or passengers in the autonomous vehicle 100. (Block 604). For example, the profile analyzer 214 may access the application to access the profile of the passenger. The profile can include information regarding preferred driving characteristics of the passenger or passengers. In some examples, the information includes inputs from the passengers, insurance information, and/or other information relating to a driving style preferred by the passenger.

The controller 102 determines whether multiple passengers are in the autonomous vehicle 100. (Block 606). For example, the profile analyzer 214 can determine the number of passengers who have been picked up (e.g., through monitoring the ride-sharing application) or the number of passengers that the autonomous vehicle 100 has accepted for a ride. When multiple passengers are detected in the autonomous vehicle 100 or are to be picked up by the autonomous vehicle 100 (e.g., block 606 returns a result of YES), the program 600 proceeds to check if there are conflicts between passenger profiles. (Block 608). If only one passenger is to be driven by the autonomous vehicle 100 (e.g., block 606 returns a result of NO), the program 600 proceeds to determine if there is a change in the passengers present in the vehicle. (Block 616).

The controller 102 determines whether conflicts exist between the passenger profiles after the determination that there are in fact multiple passengers present (e.g., block 606 returns a result of YES). (Block 608). For example, the profile determiner 214 can compare the passenger profiles of multiple passengers to determine whether any preferred driving characteristics are conflicting. When conflicts exist between the passenger profiles (e.g. block 608 returns a result of YES), the program 600 proceeds to block 610, while the program proceeds to block 616 when no conflicts are present between the passengers (e.g., block 608 returns a result of NO).

The controller 102 determines which passenger profile has the highest priority between conflicting information in the passenger profiles. (Block 610). For example, the priority determiner 210 of FIG. 2 can assign a priority level (e.g., low, medium, or high) or a priority score (e.g., a numerical value between one and ten) to each of the inputs from respective passenger profiles. In such examples (e.g. block 608 returns a result of YES), the profile analyzer 214 can determine which of the preferred driving characteristics have highest priority.

The controller 102 further determines whether adjustments to the driving characteristics are to be made. (Block 612). For example, when the profile analyzer 214 determines that a conflict exists between passenger profiles (e.g., block 608 returns a result of YES), the profile analyzer 214 determines whether the driving characteristics of the autonomous vehicle 100 are to be adjusted or remain the same. (Block 612). For example, it may be the case that the profile analyzer 214 determines that driving characteristics of a new passenger are the highest priority of the passengers present. In this case, profile analyzer 214 determines that one or more adjustments are to be made to ensure that the driving characteristics of the autonomous vehicle 100 are aligned with the driving characteristics that have higher priority (e.g., block 612 returns a result of YES). In some alternative examples, the driving characteristics of the new passenger are of lower priority than the driving characteristics currently in use, and the priority analyzer 214 determines that no adjustments are to be made to the driving characteristics (e.g., block 612 returns a result of NO). When adjustments are to be made, the program 600 proceeds to block 614, while the program 600 proceeds to block 616 when no adjustments are to be made to the driving characteristics.

The controller 102 adjusts the driving characteristics of the autonomous vehicle 100. (Block 614). For example, the program adjuster 212 can implement adjustments to the autonomous driving program to adjust the driving characteristics of the autonomous vehicle 100. In some examples, the adjustments to the driving characteristics combine driving characteristics from the different passengers in the autonomous vehicle 100. Alternatively, the driving characteristics can be adjusted to align with the preferences of one of the passengers (e.g., if the driving characteristics associated with that passenger have a higher priority level).

The controller 102 further determines whether there is a change in the passengers present in the autonomous vehicle 100. (Block 616). For example, the profile analyzer 214 detects whether the same passengers are present (e.g., block 616 returns a result of NO) or if new passenger profiles are in the autonomous vehicle 100, will be picked up in the autonomous vehicle 100, and/or are dropped off at their destinations by the autonomous vehicle 100 (e.g., block 616 returns a result of YES). When no changes to the passengers present in the autonomous vehicle 100 are detected, the program 600 proceeds to block 618. On the other hand, when changes to the passengers present in the autonomous vehicle 100 are detected, the program 600 returns to block 602.

The controller 102 determines whether to continue operation. (Block 618). For example, the controller 102 may determine to cease operation when the autonomous vehicle 100 is finished picking up and dropping off passengers (e.g., block 618 returns a result of NO). When the controller 102 is to continue operating (e.g., block 618 returns a result of YES), control of the program 600 returns to block 616. When the controller 102 is to cease operation, the program 600 concludes. In some examples, the program 600 is executed anytime the autonomous vehicle is to be used for a ride-sharing application. Additionally or alternatively, the program 600 can be executed anytime a change in the passengers of the autonomous vehicle 100 is detected. Further, the program 600 can be executed when a passenger of the autonomous vehicle 100 changes a setting or driving characteristic of the profile associated with the passenger.

FIG. 7 is a flowchart representative of machine readable instructions which may be executed to implement the example certification analyzer 222 of FIGS. 2 and/or 3 to determine whether autonomous driving software is to be certified. The example program 700 begins at block 702 where the certification analyzer 222 trains a machine learning model. (Block 702). For example, the model trainer 304 of FIG. 3 may train a machine learning model based a dataset of historic autonomous driving programs and/or metadata associated with the autonomous driving programs, and label information indicating whether a particular autonomous driving program is valid or invalid. The training of the machine learning model is discussed in further detail in connection with FIG. 8.

The certification analyzer 222 accesses an autonomous driving program. (Block 704). For example, the input processor 302 can receive an autonomous driving program from the controller 102 of FIGS. 1 and/or 2 via the server interface 220 of FIG. 2. In such an example, the autonomous driving program has been adjusted or updated by the controller 102 when the input processor 302 receives the autonomous driving program. That is, the controller 102 is awaiting a response at block 428, indicating whether the program is certified and should be applied to the vehicle.

The certification analyzer 222 processes an updated program using the machine learning model to generate a validation score. (Block 706). For example, the model executor 308 generates a validation score based on the updated autonomous driving program received by the input processor 302. In some examples, the model executor 308 uses the machine learning model stored in the model data store 310 of FIG. 3 to generate the validation score. In such examples, the model data store 310 is the most recently updated and trained machine learning model.

The certification analyzer 222 determines whether the validation score is above a first threshold. (Block 708). For example, the model executor 308 compares the validation score generated at block 706 to a first threshold value. In some examples, the first threshold is a number in a range between 0 and 1 or a percentage between 0% and 100%. In such examples, the number or percentage is an indication of a confidence level that the updated program is deserving of certification. The first threshold value determined by the example model executor 308 is thus a higher value, such as 0.75, 0.8, 0.9, etc. When the validation score is meets or exceeds the first threshold value (e.g., block 708 returns a result of YES), the program 700 proceeds to block 716. When the validation score meets or exceeds the first threshold value (e.g., block 708 returns a result of NO), the program 700 instead proceeds to block 710.

If the validation score meets or exceeds the first threshold value (e.g., block 708 returns a result of NO), the certification analyzer 222 is further to determine whether the validation score is above a second threshold. (Block 710). For example, the model executor 308 compares the validation score to a second threshold value. In some examples, the second threshold value is less than the first threshold value, such as 0.4, 0.5, 0.6, etc. When the model executor 308 determines that the validation score meets or exceeds the second threshold value (e.g., block 710 returns a result of YES), the program 700 proceeds to block 712, while the program 700 proceeds to block 718 when the validation score is below the second threshold (e.g., when block 710 returns a result of NO).

If the example certification analyzer 222 determines that the validation score meets or exceeds the second threshold (e.g., block 710 returns a result of YES), the certification analyzer 222 performs a manual validation. In this manner, autonomous driving programs that the model executor 308 determines are clearly valid are certified, autonomous driving programs that the model executor 308 determines are clearly invalid are denied, and autonomous driving programs that are neither clearly valid nor clearly invalid result in an additional manual validation. In some examples, the user interface 314 of FIG. 3 allows a user to access information regarding the updated autonomous driving program and the validation score. The user interface 314 can further receive inputs from the user and transmit the inputs to the model executor 308 to determine whether the updated program is to be certified. In some examples, the input is an adjustment to the autonomous driving program (e.g., to make the autonomous driving program valid). In some other examples, the input is an indication of whether the autonomous driving program is to be considered valid or invalid.

The certification analyzer 222 determines whether to certify the updated program based on the manual validation. (Block 714). For example, when the model executor 308 receives inputs from a user via the user interface 314, the model executor 308 determines whether the updated program is to be certified. In some examples, an adjustment to the autonomous driving program may be made, such that the example model executor 308 generates a new validation score (e.g., control may return to block 706). In some other examples, the input may simply indicate whether the autonomous driving program is valid or invalid, in which case control proceeds to either block 716 or 718. When the updated program is to be certified based on the manual validation (e.g., block 714 returns a result of YES), the program 700 proceeds to block 716. On the other hand, when the updated program is not to be certified (e.g. block 714 returns a result of NO), the program 700 proceeds to block 718.

If the autonomous driving program is deemed to be valid (e.g., block 714 returns a result of YES or block 708 returns a result of YES) the certification analyzer 222 returns a certificate indicating the validity of the autonomous driving program. (Block 716). For example, when the model executor 308 determines that the updated autonomous driving program is to be certified, the output handler 312 is to output an indication that the autonomous driving program is valid. In some examples, the indication that the autonomous driving program is valid is a cryptographic certificate. However, in some other examples, the indication that the autonomous driving program is valid is a Boolean value and/or other value indicating that the provided autonomous driving program is valid.

If the autonomous driving program is not valid (e.g., if block 714 returns a result of NO or block 710 returns a result of NO), the certification analyzer 222 returns an indication of a denial of the certification. For example, when the model executor 308 determines that the updated autonomous driving program is not to be certified, the output handler 312 is to output a denial of certification from the certification analyzer 222. Such a denial indicates that the program adjuster 212 is not to apply and/or otherwise implement the autonomous driving program.

The certification analyzer 222 stores a result of the validation of the autonomous driving program (block 720). For example, the model executor 308 stores the validation results (e.g., the certificate, the indication of denial, etc.) from block 716 and/or block 718 in the model data store 310. In some examples, the autonomous driving program and/or metadata associated therewith is also stored. In some examples, the validation results are stored for future access and/or for further training of the machine learning model.

The certification analyzer 222 determines whether to retrain the machine learning model. For example, the model trainer 304 can determine whether to retrain the machine learning model based on the results of the certification of the updated program. In some examples, the model data store 310 stores results until a predetermined number of results is met, and the model trainer 304 determines that retraining is to be performed based on the predetermined number of results. When the machine learning model is to be retrained (e.g., block 722 returns a result of YES), the program 700 returns to block 702. When the machine learning model is not to be retrained (e.g., block 722 returns a result of NO), the program 700 concludes.

FIG. 8 is a flowchart representative of machine readable instructions which may be executed to implement the example certification analyzer 222 of FIGS. 2 and/or 3 to train a machine learning model. The example program 800 begins at block 802, where the certification analyzer 222 obtains a dataset. In examples disclosed herein, the dataset represents autonomous driving programs and/or or metadata in connection with the autonomous driving program(s) (e.g., user information/identification, insurance policy data for the user, etc.) In some examples, the input processor 302 receives the dataset via the server interface 220 of FIG. 2. The dataset represents training data that is used to train a machine learning model that can later be used to determine whether an autonomous driving program provided by an autonomous vehicle is to be certified and/or validated.

The example model trainer 304 causes the example model executor 308 to process the dataset (e.g., autonomous driving programs(s) and metadata associated therewith, in connection with corresponding indications of whether the autonomous driving program(s) are valid or not) and/or a portion thereof using the machine learning model stored in the model data store 310. (Block 804). The example model trainer 304 reviews the output of the model executor 308 to determine an amount of error of the machine learning model. (Block 806). For example, the model trainer 304 reviews the outputs of the machine learning model to determine whether the outputs from the model match the sample outputs included in the dataset.

The example model trainer 304 determines whether to continue training. (Block 810). In examples disclosed herein, the example model trainer determines whether to continue training based on whether the calculated amount of error (determined at block 806) exceeds a threshold amount of error. (Block 810). If model training is to proceed (e.g., block 810 returns a result of YES), the example model trainer 304 adjusts parameters of the machine learning model. (Block 812). In some examples, the amount of adjustment to the parameters of the machine learning model is based on the calculated amount of error. Control then proceeds to block 804, where the process of blocks 804 through 812 is repeated until the calculated amount of error is less than the threshold amount of error (e.g., until block 810 returns a result of NO).

Figure 9:
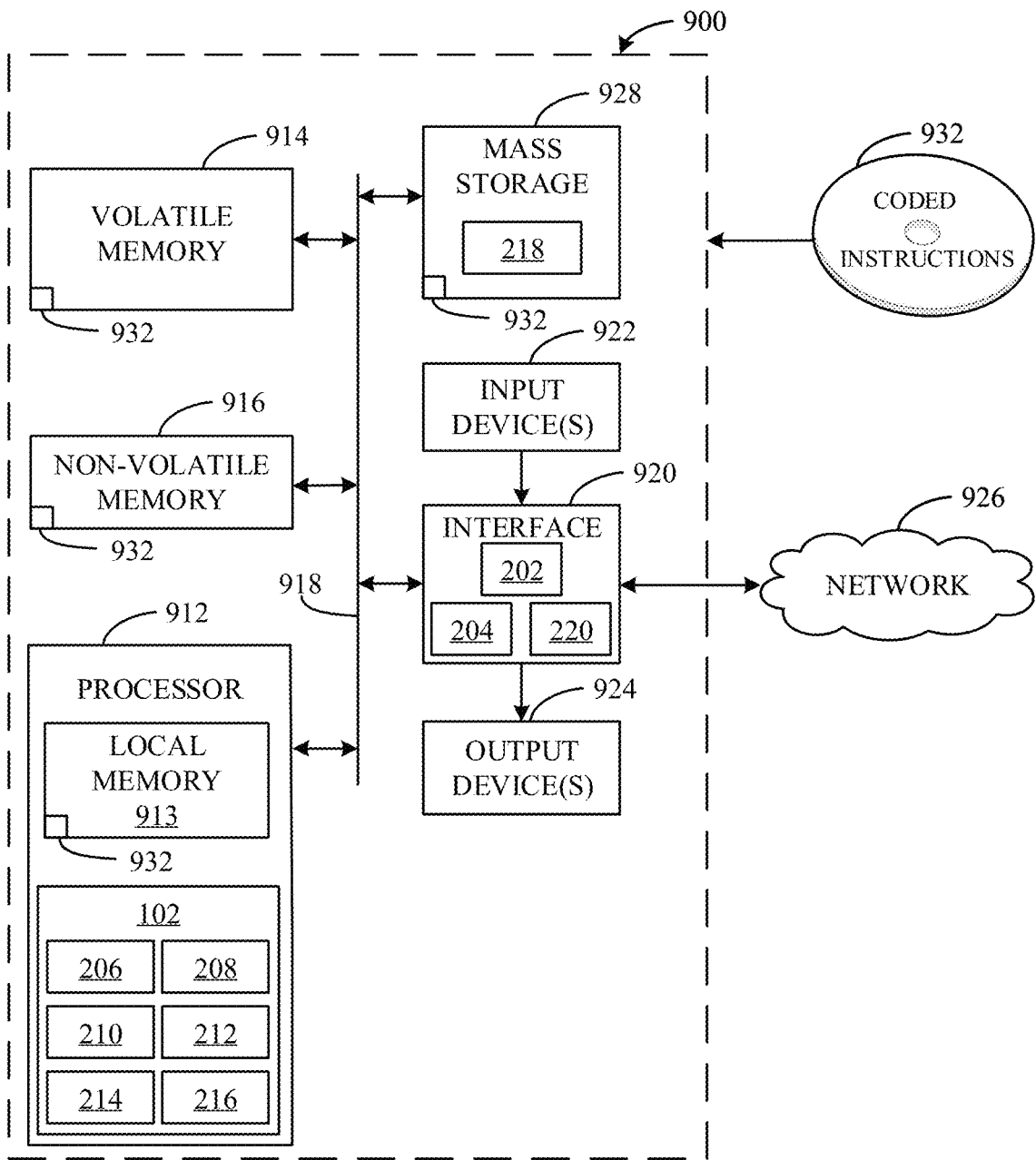
FIG. 9 is a block diagram of an example processing platform structured to execute the instructions of FIGS. 4, 5, and/or 6 to implement the example controller of FIGS. 1 and/or 2.

FIG. 9 is a block diagram of an example processor platform 900 structured to execute the instructions of FIGS. 4, 5, and/or 6 to implement the controller 102 of FIGS. 1 and/or 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example input analyzer 206, the example category determiner 208, the example priority determiner 210, the example program adjuster 212, the example profile analyzer 214, the example adjustment evaluator 216, and the example server interface 220.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc. The interface circuit 920 of FIG. 9 implements the example sensor interface 202, the example driver input interface 204, and the example server interface 220 of FIG. 2.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 4-6 may be stored in the mass storage device 928, in the volatile memory 914, in the non-volatile memory 916, and/or on a removable non-transitory computer readable storage medium such as a CD or DVD. The mass storage device 928 of FIG. 9 implements the example database 218 of FIG. 2.

Figure 10:
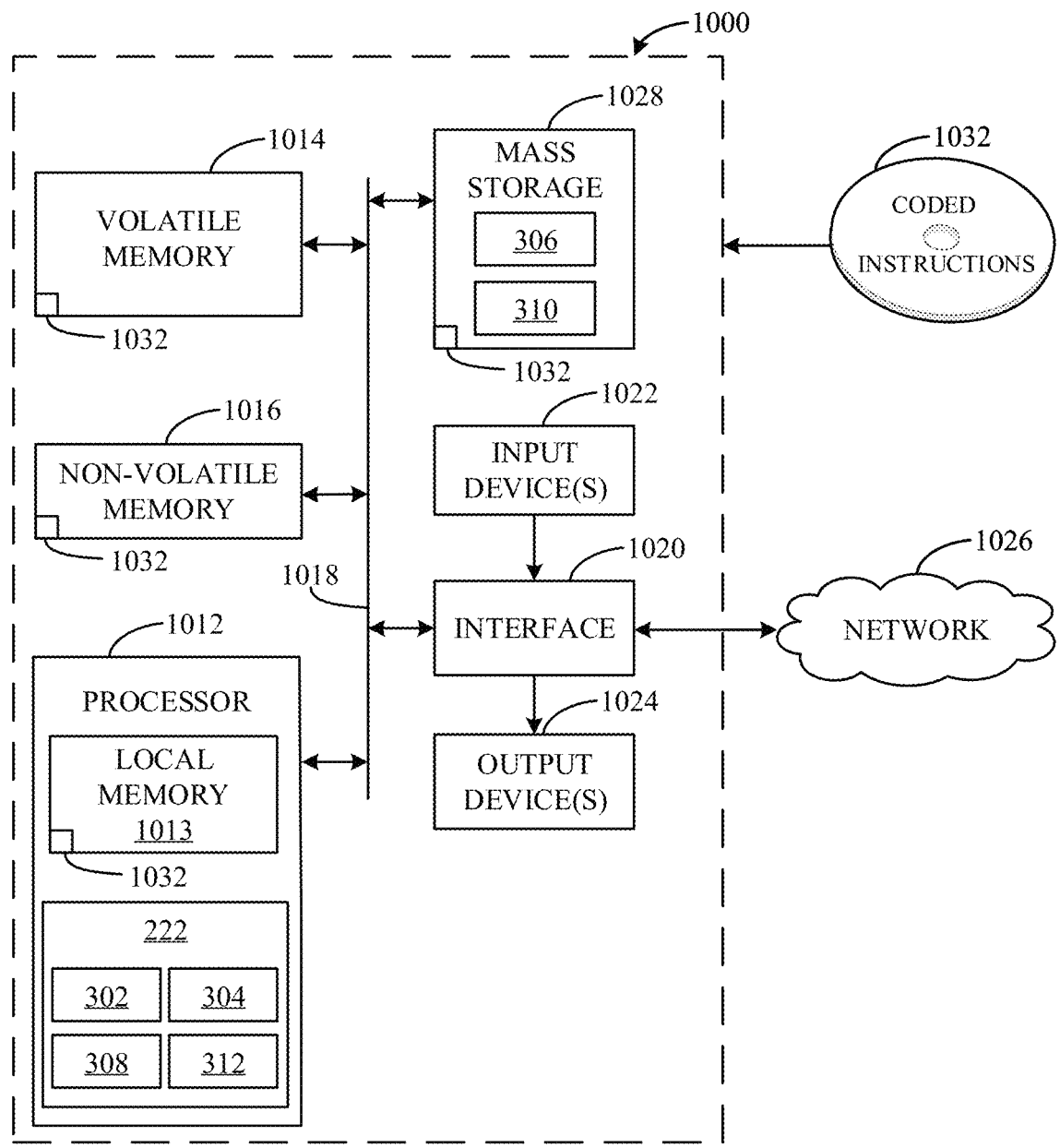
FIG. 10 is a block diagram of an example processing platform structured to execute the instructions of FIGS. 7 and/or 8 to implement the example certification analyzer of FIGS. 2 and/or 3.

FIG. 10 is a block diagram of an example processor platform 1000 structured to execute the instructions of FIGS. 7 and/or 8 to implement the certification analyzer 222 of FIGS. 2 and/or 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example input processor 302, the example model trainer 304, the example model executor 308, and the example output handler 312.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface. In the illustrated example of FIG. 10, the interface circuit 1020 implements the example user interface 314.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives. The example mass storage devices 1028 of FIG. 10 includes the example training data store 306 and the example model data store 310.

The machine executable instructions 1032 of FIG. 7 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that adjust autonomous vehicle driving software using machine programming. The examples disclosed herein allow autonomous driving software for an autonomous vehicle to be updated based on inputs that are specific to the autonomous vehicle. The individualized updates can, for example, lead to improvements in the responsiveness of the autonomous vehicle to the preferences of drivers or passengers of the autonomous vehicle. The examples disclosed herein can further lead to improved performance of the autonomous vehicle in driving conditions experienced by the vehicle. Further examples and combinations thereof include the following:

Example 1 includes an apparatus for adjusting autonomous driving software of a vehicle, the apparatus comprising an input analyzer to determine a software adjustment based on an obtained driving input, a priority determiner to determine a priority level of the software adjustment, and a program adjuster to, when the priority level is above a threshold, identify a parameter of the autonomous driving software of the vehicle associated with the software adjustment and adjust the parameter based on the software adjustment, the adjustment to the parameter to change driving characteristics of the vehicle.

Example 2 includes the apparatus of example 1, further including an adjustment evaluator to, prior to adjusting the parameter, evaluate the adjustment to the parameter and, when the evaluation of the adjustment is successful, allow the adjustment to the parameter.

Example 3 includes the apparatus of example 2, wherein the evaluation of the adjustment is performed at the vehicle.

Example 4 includes the apparatus of example 2, further including a server interface to transmit information associated with the adjustment to a processing entity outside of the vehicle to perform the evaluation of the adjustment.

Example 5 includes the apparatus of example 2, wherein the adjustment evaluator is to, when the evaluation of the adjustment is unsuccessful, prevent the adjustment to the parameter.

Example 6 includes the apparatus of example 21, wherein the an adjustment evaluator is to determine whether the software adjustment is lawful and, when the software adjustment is lawful, allow the adjustment to the parameter.

Example 7 includes the apparatus of example 6, wherein the adjustment evaluator is to, when the software adjustment is determined to be unlawful, prevent the adjustment to the parameter.

Example 8 includes the apparatus of example 1, wherein the program adjuster is to determine whether the adjustment to the parameter is to occur immediately and, when the adjustment is to occur immediately, allow the adjustment to the parameter to occur in real-time.

Example 9 includes the apparatus of example 8, wherein the program adjuster is to, when the adjustment is not to occur immediately, prevent the adjustment to the parameter.

Example 10 includes a method for adjusting autonomous driving software of a vehicle, the method comprising determining a software adjustment based on an obtained driving input, determining a priority level of the software adjustment, when the priority level is above a threshold, identifying a parameter of the autonomous driving software of the vehicle associated with the software adjustment, and adjusting the parameter based on the software adjustment, the adjustment to the parameter to change driving characteristics of the vehicle.

Example 11 includes the method of example 10, further including prior to adjusting the parameter, evaluating the adjustment to the parameter, and when the evaluation of the adjustment is successful, allowing the adjustment to the parameter.

Example 12 includes the method of example 11, wherein the evaluation of the adjustment is performed at the vehicle.

Example 13 includes the method of example 11, wherein the evaluation of the adjustment is performed by transmitting information associated with the adjustment to the parameter to a processing entity outside of the vehicle.

Example 14 includes the method of example 10, further including determining whether the software adjustment is lawful and, when the software adjustment is lawful, allowing the adjustment to the parameter.

Example 15 includes the method of example 10, further including determining whether the adjustment to the parameter is to occur immediately and, when the adjustment is to occur immediately, allowing the adjustment to the parameter to occur in real-time.

Example 16 includes at least one tangible computer readable storage medium comprising instructions that, when executed, cause at least one processor machine to at least determine a software adjustment based on an obtained driving input, determine a priority level of the software adjustment, when the priority level is above a threshold, identify a parameter of autonomous driving software of a vehicle associated with the software adjustment, and adjust the parameter based on the software adjustment, the adjustment to the parameter to change driving characteristics.

Example 17 includes the at least one tangible computer readable storage medium of example 16, wherein the instructions further cause the at least one processor machine to prior to adjusting the parameter, evaluate the adjustment to the parameter, and when the evaluation of the adjustment is successful, allow the adjustment to the parameter.

Example 18 includes the at least one tangible computer readable storage medium of example 17, wherein the evaluation of the adjustment is performed at the vehicle.

Example 19 includes the at least one tangible computer readable storage medium of example 17, wherein the evaluation of the adjustment is performed by transmitting information associated with the adjustment to the parameter to a processing entity outside of the vehicle.

Example 20 includes the at least one tangible computer readable storage medium of example 16, wherein the instructions, when executed, further cause the at least one processor machine to determine whether the software adjustment is lawful and, when the software adjustment is lawful, allow the adjustment to the parameter.

Example 21 includes the at least one tangible computer readable storage medium of example 16, wherein the instructions, when executed, further cause the at least one processor machine to determine whether the adjustment to the parameter is to occur immediately and, when the adjustment is to occur immediately, allow the adjustment to the parameter to occur in real-time.

Example 22 includes an apparatus for adjusting autonomous driving software of a vehicle, the apparatus comprising means for generating a software adjustment based on an obtained driving input, means for determining a priority level of the software adjustment, means for identifying a parameter of the autonomous driving software of the vehicle associated with the software adjustment when the priority level is above a threshold, and means for adjusting the parameter based on the software adjustment, the adjustment to the parameter to change driving characteristics of the vehicle. The example means for generating can be implemented by the input analyzer 206. The example means for determining can be implemented by the example priority determiner 210. The example means for adjusting can be implemented by the program adjuster 212.

Example 23 includes the apparatus of example 22, further including means for evaluating the adjustment to the parameter prior to adjusting the parameter and, when the evaluation of the adjustment is successful, the means for evaluating is to allow the adjustment to the parameter. The example means for evaluating can be implemented by the adjustment evaluator 216.

Example 24 includes the apparatus of example 22, further including means for evaluating to determine whether the software adjustment is lawful and, when the software adjustment is lawful, allow the adjustment to the parameter. The example means for evaluating can be implemented by the adjustment evaluator 216.

Example 25 includes the apparatus of example 22, wherein the means for adjusting is to determine whether the adjustment to the parameter is to occur immediately and, when the adjustment is to occur immediately, allow the adjustment to the parameter to occur in real-time. The example means for adjusting can be implemented by the program adjuster 212.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for adjusting autonomous driving software of a vehicle, the apparatus comprising:
    an input analyzer to determine a software adjustment based on an obtained driving input;
    a priority determiner to determine a priority level of the software adjustment based on a source of the driving input; and
    a program adjuster to, when the priority level is above a threshold:
        identify a parameter of the autonomous driving software of the vehicle associated with the software adjustment; and
        adjust the parameter based on the software adjustment, the adjustment to the parameter to change driving characteristics of the vehicle.

2. The apparatus of claim 1, further including an adjustment evaluator to, prior to adjusting the parameter, evaluate the adjustment to the parameter and, when the evaluation of the adjustment is successful, allow the adjustment to the parameter.

3. The apparatus of claim 2, wherein the evaluation of the adjustment is performed at the vehicle.

4. The apparatus of claim 2, further including a server interface to transmit information associated with the adjustment to a processing entity outside of the vehicle to perform the evaluation of the adjustment.

5. The apparatus of claim 2, wherein the adjustment evaluator is to, when the evaluation of the adjustment is unsuccessful, prevent the adjustment to the parameter.

6. The apparatus of claim 2, wherein the adjustment evaluator is to determine whether the software adjustment is lawful and, when the software adjustment is lawful, allow the adjustment to the parameter.

7. The apparatus of claim 6, wherein the adjustment evaluator is to, when the software adjustment is determined to be unlawful, prevent the adjustment to the parameter.

8. The apparatus of claim 1, wherein the program adjuster is to determine whether the adjustment to the parameter is to occur immediately and, when the adjustment is to occur immediately, allow the adjustment to the parameter to occur in real-time.

9. The apparatus of claim 8, wherein the program adjuster is to, when the adjustment is not to occur immediately, prevent the adjustment to the parameter.

10. A method for adjusting autonomous driving software of a vehicle, the method comprising:
    determining, by executing an instruction with one or more processors, a first software adjustment based on a first obtained driving input;
    determining, by executing an instruction with the one or more processors, a second software adjustment based on a second obtained driving input;
    determining, by executing an instruction with the one or more processors, a first and second priority level of the first and second software adjustments; and
    when the first priority level is above the second priority level:
        identifying, by executing an instruction with the one or more processors, a first parameter of the autonomous driving software of the vehicle associated with the first software adjustment;
        adjusting, by executing an instruction with the one or more processors, the first parameter based on the first software adjustment at a first time, the adjustment to the first parameter to change driving characteristics of the vehicle
        identifying, by executing an instruction with the one or more processors, a second parameter of the autonomous driving software of the vehicle associated with the second software adjustment; and
        adjusting, by executing an instruction with the one or more processors, the second parameter based on the second software adjustment at a second time after the first time, the adjustment to the second parameter to change driving characteristics of the vehicle.

11. The method of claim 10, further including:
    prior to adjusting the first parameter, evaluating the adjustment to the first parameter; and
    when the evaluation of the adjustment is successful, allowing the adjustment to the first parameter.

12. The method of claim 11, wherein the evaluation of the adjustment is performed at the vehicle.

13. The method of claim 11, wherein the evaluation of the adjustment is performed by transmitting information associated with the adjustment to the first parameter to a processing entity outside of the vehicle.

14. The method of claim 10, further including determining whether the first software adjustment is lawful and, when the first software adjustment is lawful, allowing the adjustment to the first parameter.

15. The method of claim 10, further including determining whether the adjustment to the first parameter is to occur immediately and, when the adjustment is to occur immediately, allowing the adjustment to the first parameter to occur in real-time.

16. At least one tangible non-transitory computer readable medium comprising instructions that, when executed, cause at least one processor to at least:
   determine a software adjustment based on an obtained driving input;
   determine whether the software adjustment is high priority, medium priority, or low priority; and
   when the priority level is medium priority:
      before processing low priority software adjustments and after processing high software adjustments, identify a parameter of autonomous driving software of a vehicle associated with the software adjustment; and
      adjust the parameter based on the software adjustment, the adjustment to the parameter to change driving characteristics.

17. The at least one tangible non-transitory computer readable medium of claim 16, wherein the instructions further cause the at least one processor to:
   prior to adjusting the parameter, evaluate the adjustment to the parameter; and
   when the evaluation of the adjustment is successful, allow the adjustment to the parameter.

18. The at least one tangible non-transitory computer readable medium of claim 17, wherein the evaluation of the adjustment is performed at the vehicle.

19. The at least one tangible non-transitory computer readable medium of claim 17, wherein the evaluation of the adjustment is performed by transmitting information associated with the adjustment to the parameter to a processing entity outside of the vehicle.

20. The at least one tangible non-transitory computer readable medium of claim 16, wherein the instructions, when executed, cause the at least one processor to determine whether the software adjustment is lawful and, when the software adjustment is lawful, allow the adjustment to the parameter.

21. The at least one tangible non-transitory computer readable medium of claim 16, wherein the instructions, when executed, cause the at least one processor to determine whether the adjustment to the parameter is to occur immediately and, when the adjustment is to occur immediately, allow the adjustment to the parameter to occur in real-time.

22. An apparatus for adjusting autonomous driving software of a vehicle, the apparatus comprising:
   means for generating a software adjustment based on an obtained driving input;
   means for determining a priority level of the software adjustment based on a category of the software adjustment; and
   means for adjusting a parameter, the means for adjusting to, when the priority level is above a threshold:
      identify the parameter of the autonomous driving software of the vehicle associated with the software adjustment; and
      adjust the parameter based on the software adjustment, the adjustment to the parameter to change driving characteristics of the vehicle.

23. The apparatus of claim 22, further including means for evaluating the adjustment to the parameter prior to adjusting the parameter and, when the evaluation of the adjustment is successful, the means for evaluating is to allow the adjustment to the parameter.

24. The apparatus of claim 22, further including means for evaluating to determine whether the software adjustment is lawful and, when the software adjustment is lawful, allow the adjustment to the parameter.

25. The apparatus of claim 22, wherein the means for adjusting is to determine whether the adjustment to the parameter is to occur immediately and, when the adjustment is to occur immediately, allow the adjustment to the parameter to occur in real-time.

26. The apparatus of claim 22, wherein the category includes at least one of a speed adjustment, an acceleration adjustment, a braking adjustment, a comfort adjustment, a safety adjustment, a passenger enjoyment adjustment, a minor adjustment, or a major adjustment.

27. An apparatus to adjust a parameter of autonomous driving software, the apparatus including:
   memory;
   instructions included in the apparatus; and
   processor circuitry to execute the instructions to at least:
      determine a software adjustment based on an obtained driving input;
      determine a priority level of the software adjustment based on whether the driving input provided from a driver of a vehicle or a passenger of the vehicle; and
      when the priority level corresponding to the driver:
         identify a parameter of autonomous driving software of the vehicle associated with the software adjustment; and
         adjust the parameter based on the software adjustment, the adjustment to the parameter to change driving characteristics.

28. The apparatus of claim 27, wherein the processor circuitry is to:
   prior to adjusting the parameter, evaluate the adjustment to the parameter; and
   when the evaluation of the adjustment is successful, allow the adjustment to the parameter.

29. The apparatus of claim 28, wherein the evaluation of the adjustment is performed at the vehicle.

30. The apparatus of claim 28, wherein the evaluation of the adjustment is performed by transmitting information associated with the adjustment to the parameter to a processing entity outside of the vehicle.

31. The apparatus of claim 27, wherein the processor circuitry is to determine whether the adjustment to the parameter is to occur immediately and, when the adjustment is to occur immediately, allow the adjustment to the parameter to occur in real-time.

* * * * *